United States Patent
Ishii

(10) Patent No.: US 9,532,141 B2
(45) Date of Patent: Dec. 27, 2016

(54) PROTECTION APPARATUS FOR SOUND SIGNAL CONVERTING DEVICE

(71) Applicant: YAMAHA CORPORATION, Hamamatsu-shi (JP)

(72) Inventor: Jun Ishii, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 14/430,807

(22) PCT Filed: Jul. 22, 2013

(86) PCT No.: PCT/JP2013/069819
§ 371 (c)(1),
(2) Date: Mar. 24, 2015

(87) PCT Pub. No.: WO2014/045705
PCT Pub. Date: Mar. 27, 2014

(65) Prior Publication Data
US 2015/0256931 A1     Sep. 10, 2015

(30) Foreign Application Priority Data
Sep. 24, 2012 (JP) .................................. 2012-209274

(51) Int. Cl.
H03G 11/00 (2006.01)
H04R 3/00 (2006.01)
(Continued)

(52) U.S. Cl.
CPC ................ *H04R 3/007* (2013.01); *G10H 1/32* (2013.01); *H02H 7/20* (2013.01); *H02P 29/02* (2013.01); *H04R 9/022* (2013.01)

(58) Field of Classification Search
None
See application file for complete search history.

(56) References Cited

U.S. PATENT DOCUMENTS

| 2002/0118841 A1 | 8/2002 | Button et al. |
| 2008/0055799 A1 | 3/2008 | Serizawa et al. |
| (Continued) |

FOREIGN PATENT DOCUMENTS

| CN | 101877807 A | 11/2010 |
| JP | 03222600 A | 10/1991 |
| (Continued) |

OTHER PUBLICATIONS

Extended European Search Report issued in European Appln. No. 13839688.2, mailed Feb. 25, 2016.
(Continued)

*Primary Examiner* — Regina N Holder
(74) *Attorney, Agent, or Firm* — Rossi, Kimms & McDowell LLP

(57) ABSTRACT

An audio signal output from a tone generator 14 is fed into a coil 16 provided in a transducer for vibrating a sound board, so that a sound signal is generated by the vibration of the sound board. A microcomputer 30 obtains temperature values of the coil 16 measured by two different methods, and suspends supply of audio signals to the coil 16 or reduces the amount of audio signals supplied to the coil 16 if the difference between the two coil temperature values is outside a predetermined range. In a case as well where one of the two coil temperature values has risen excessively, the microcomputer 30 suspends supply of audio signals to the coil 16 or reduces the amount of audio signals supplied to the coil 16.

20 Claims, 26 Drawing Sheets

(51) Int. Cl.
  *G10H 1/32*   (2006.01)
  *H02P 29/02*  (2016.01)
  *H02H 7/20*   (2006.01)
  *H04R 9/02*   (2006.01)

(56)  References Cited

U.S. PATENT DOCUMENTS

2009/0257599 A1   10/2009  Sand Jensen et al.
2014/0321656 A1*  10/2014  Kim ..................... H04R 3/007
                                                    381/58

FOREIGN PATENT DOCUMENTS

| JP | 2004007107 A | 1/2004 |
| JP | 2007174384 A | 7/2007 |
| JP | 2008058134 A | 3/2008 |
| JP | 2008131703 A | 6/2008 |
| JP | 2008187856 A | 8/2008 |
| JP | 2008292739 A | 12/2008 |
| JP | 2010226797 A | 10/2010 |

OTHER PUBLICATIONS

International Search Report issued in PCT/JP2013/069819, mailed Aug. 20, 2013. English translation provided.
Written Opinion issued in PCT/JP2013/069819, mailed Aug. 20, 2013. English translation provided.

* cited by examiner (A)

(B)

(A)

(B)

(C)

(A)

(B)

(A)

(B)

(A)

(B)

(A)

(B)

(A)

(B)

(A)

(B)

(A)

(B)

(A)

(B)

(A)

(B)

PROTECTION APPARATUS FOR SOUND SIGNAL CONVERTING DEVICE

BACKGROUND OF THE INVENTION

1. Field of the Invention

The present invention relates to a protection apparatus for a sound signal converting device, the apparatus preventing rise in temperature of a coil of the sound signal converting device in order to protect the sound signal converting device.

2. Description of the Related Art

Conventionally, as described in Patent Literature 1, for example, there is a known keyboard musical instrument having a sound board. The keyboard musical instrument supplies an audio signal to a coil of a transducer which vibrates the sound board, the audio signal being indicative of a musical tone generated by a tone generator in accordance with player's musical performance on a keyboard. And the keyboard musical instrument vibrates the sound board in accordance with the audio signal indicative of the musical tone to generate a musical tone of a low tone volume.

Furthermore, Patent Literature 2 discloses an art for preventing rise in temperature of a speaker to protect the speaker. In the art, temperature of the speaker is measured by use of a thermistor, and supply of audio signals to the speaker is restricted if the measured temperature is equal to or higher than a predetermined amount of temperature.

CITATION LIST

Patent Literature

[PTL 1] JP 2008-292739 A
[PTL 2] JP 2007-174384 A

SUMMARY OF THE INVENTION

Problem to be Solved by Invention

However, the keyboard musical instrument having the sound board disclosed in the above-described Patent Literature 1 has a problem. That is, a large amount of current can be fed into the coil in order to vibrate the sound board. The large amount of current causes excessive rise in temperature of the coil due to lead to unexpected conditions of the coil and its peripheral devices, or burnout of the coil and its peripheral devices. In order to solve the disadvantage, it can be considered to protect the coil and its peripheral devices by use of measured temperature of the speaker, as in the case of the art disclosed in the above-described Patent Literature 2. By the art disclosed in Patent Literature 2, however, since the temperature of the speaker is measured only by one thermistor, reliability of the measured temperature is questioned, failing to protect the coil and its peripheral devices with high accuracy.

Means for Solving the Problem

The present invention was accomplished to solve the above-described problem, and an object thereof is to provide a protection apparatus for a sound signal converting device, the apparatus protecting a coil and peripheral devices of the coil with high accuracy. In descriptions of constituent features of the present invention which will be described below, numerical references of corresponding components of embodiments which will be described later are given in parentheses in order to facilitate the understanding of the invention. However, it should not be understood that the constituent features of the invention are limited to the corresponding components of the embodiments indicated by the numerical references.

A protection apparatus for a sound signal converting device (40) having a coil (16) that converts an audio signal supplied to the coil to a sound signal, for protecting the sound signal converting device. The protection apparatus includes a level controller (24, 24-1, 24-2) configured to supply an input audio signal to the coil in one of a first state where a level of the audio signal is maintained or a second state where supply of the input audio signal to the coil is suspended or the level of the audio signal to the coil is decreased. It further includes a first temperature measurement device (21 or 30, 104 to 108, S101, S102 or 21) configured to measure the temperature of the coil as a first measured temperature and a second temperature measurement device (30, S13, S14 or 30, S13, S14 or 30, 104 to 108, S101, S103) configured to measure the temperature of the coil as a second measured temperature, independently of the first temperature measurement device. It further includes an unexpected condition controller (30, S29, S31, S33) configured to set the level controller to the second state when a difference between the first measured temperature and the second measured temperature is outside a predetermined range and a temperature controller (30, S37, S38) configured to keep the level controller at the first state when the difference between the first measured temperature and the second measured temperature falls within the predetermined range, while the first measured temperature or the second measured temperature is lower than a first predetermined temperature, and switch the level controller to the second state when the difference between the first measured temperature and the second measured temperature falls within the predetermined range, while the first measured temperature or the second measured temperature is equal to or higher than the first predetermined temperature.

In this case, for example, the first temperature measurement device can be a temperature sensor (21) that senses the temperature of the coil, and the second temperature measurement device calculates the temperature of the coil on the basis of a thermal equivalent circuit of the sound signal converting device (30, S13, S14). Furthermore, the first temperature measurement device determines the temperature of the coil on the basis of a change in resistance value according to the temperature of the coil (30, 104 to 108, S101, S102), and the second temperature measurement device calculates the temperature of the coil on the basis of a thermal equivalent circuit of the sound signal converting device (30, S13, S14). Furthermore, the second temperature measurement device can also determine the temperature of the coil on the basis of a change in resistance value according to temperature of the coil (30, 104 to 108, S101, S102).

Since the temperature controller switches the level controller to the second state to suspend the supply of the input audio signal to the coil or decrease the level of the input audio signal to the coil when the difference between the first measured temperature and the second measured temperature falls within the predetermined range, while the first measured temperature or the second measured temperature is equal to or higher than the first predetermined temperature, the rise in temperature of the coil and its peripheral devices can be prevented to protect the sound signal converting device. Furthermore, since the unexpected condition controller sets the level controller to the second state to suspend the supply of the input audio signal to the coil or decrease the level of the input audio signal to the coil when the difference between the first measured temperature and the second measured temperature is outside the predetermined range, the sound signal converting device can be protected appropriately even under fault conditions of the first temperature measurement device or the second temperature measurement device.

Another feature is that the protection apparatus further includes an atmosphere temperature sensor (22) configured to sense atmosphere temperature of the sound signal converting device. The unexpected condition controller means further sets the level controller to the second state when the first measured temperature or the second measured temperature is outside a predetermined range with respect to the sensed atmosphere temperature (30, S25, S27, S33). This feature can enhance reliability of the first measured temperature and the second measured temperature more to protect the sound signal converting device more appropriately.

Another feature is that the unexpected condition controller further sets the level controller to the second state when the sensed atmosphere temperature is outside another predetermined range (30, S15, S17, S33). This feature can enhance reliability of the atmosphere temperature measured by the atmosphere temperature sensor to protect the sound signal converting device more appropriately.

Another feature is that the unexpected condition controller further sets the level controller to the second state when the first measured temperature or the second measured temperature is outside another predetermined range (30, S19, S21, S23, S33). This feature can enhance reliability of the first or second measured temperature measured by the first or second temperature measurement device to protect the sound signal converting device more appropriately.

Another feature is that the protection apparatus further includes a display unit device (31) and an unexpected condition display controller (30, S16, S18, S20, S22, S24, S26, S28, S30, S32) configured to display a type of unexpected condition of the first temperature measurement device, the second temperature measurement device or the atmosphere temperature sensor on the display device when the level controller is set to the second state by the unexpected condition controller. Under the fault conditions of the first temperature measurement device, the second temperature measurement device or the atmosphere temperature sensor, this feature can allow a user to appropriately cope with the fault conditions.

Another feature is that the temperature controller means further includes a level control cancel controller (30, S36, S40, S41) configured to switch the level controller to the first state when the first measured temperature or the second measured temperature is lower than a second predetermined temperature, which is lower than the first predetermined temperature while the level controller has been turned to the second state by the temperature controller means. According to this feature, in a case where the sound signal converting device no longer needs to be protected because of the decrease in the temperature of the coil by suspension the supply of the input audio signal to the coil or decreasing the level of the audio signal to the coil, the supply of the audio signal to the coil is automatically resumed to improve the usability.

DESCRIPTION OF THE PREFERRED EMBODIMENT a. First Embodiment

The first embodiment is configured to employ a coil temperature sensor 21 for directly sensing temperature of a coil 16 as the first temperature measurement means for measuring temperature of the coil 16. The first embodiment also employs measurement means for measuring temperature of the coil by performing calculation based on a thermal equivalent circuit of a sound signal converting device (transducer) 40 as the second temperature measurement means for measuring temperature of the coil 16. In the first embodiment, the temperature of the coil 16 detected by the first temperature measurement means will be represented as Tc1, while the temperature of the coil 16 detected by the second temperature measurement means will be represented as Tc2.

Figure 1:
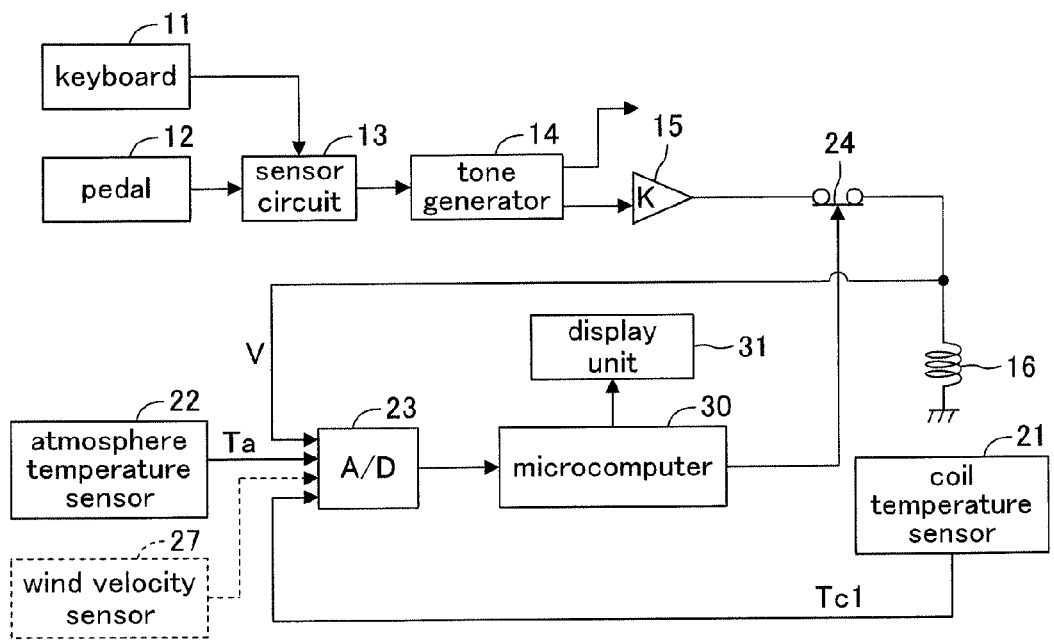
FIG. 1 is a schematic block diagram indicating an electronic circuit embedded in a piano in order to vibrate a sound board according to the first embodiment of the present invention.

A piano according to the first embodiment of the present invention will now be explained. The piano, which drives a hammer through an action mechanism in response to a depression and release of a key provided on a keyboard to generate a piano sound by a strike of strings by the hammer, also has a function of controlling to drive the transducer by an electric signal (audio signal) to make the transducer drive a sound board to generate a softened tone. Hereafter, a part for generating a softened tone which is directly related to the invention will be explained in detail. FIG. 1 is a schematic block diagram indicating an electronic circuit embedded in the piano to vibrate the sound board in order to generate softened piano tones or softened tones of a different musical instrument.

The piano has a keyboard 11 and a pedal 12. The keyboard 11 is composed of a plurality of white keys and a plurality of black keys to serve as musical performance means operated to depress or release the keys by player's hands. The pedal 12 is composed of a damper pedal, a soft pedal, a shift pedal, a sostenuto pedal and the like to serve as musical performance means operated by a player's foot.

Furthermore, the piano has a sensor circuit 13, a tone generator 14, an amplifier circuit 15 and a coil 16 in order to generate softened musical tones. The sensor circuit 13 is formed of a plurality of sensors for sensing the position of a depressed key and the velocity of a key-depression on the keyboard 11, the position and the velocity of a traveling hammer which is not shown but is driven by a player's key-depression on the keyboard 11, and the position of the pedal 12 operated by the player.

In accordance with the position and the velocity of the key-depression on the keyboard 11, the position and velocity of the traveled hammer, and the position of the operated pedal 12 sensed by the sensor circuit 13, the tone generator 14 outputs a musical tone signal having a tone pitch corresponding to the key depressed on the keyboard 11 in a tone volume corresponding to the velocity of the key-depression in accordance with player's operation on the pedal 12. Normally, musical tone signals output by the tone generator 14 are audio signals corresponding to piano tones, but can be audio signals corresponding to musical tones of a musical instrument other than piano. The audio signal output by the tone generator 14 is output to the coil 16 via the amplifier circuit 15. In the figure, although the tone generator 14 is designed to output a different audio signal as well, the different audio signal is to be used for a different channel and to be output to a circuit device similar to a circuit device which will be explained below. For simplicity's sake, however, the destination to which the audio signal for the different channel will be output is not shown in the figure. Furthermore, the audio signal output by the tone generator 14 can be supplied not only to the coil 16 but also to headphones, a different audio apparatus and the like.

The amplifier circuit 15 amplifies the input audio signal with a predetermined amplification factor K, and outputs the amplified signal to one end of the coil 16 via a relay circuit 24 which will be described later. The coil 16 is provided inside the transducer 40, with the other end of the coil 16 being grounded. As a result, by the output of the audio signal from the tone generator 14, a current corresponding to the audio signal is fed into the coil 16.

Figure 2:
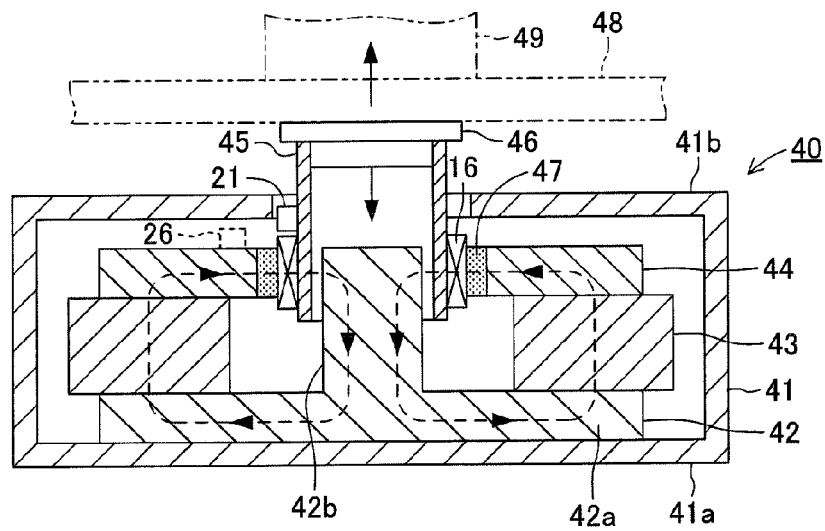
FIG. 2 is a horizontal section view of a transducer which vibrates the sound board.

The transducer 40 has a bottom surface 41a and an upper surface 41b to have a box 41 having a cylindrical space thereinside, as indicated in the horizontal section view of FIG. 2. The box 41 is fastened to a supporting column of the piano at the bottom surface 41a, and has a circular through hole at the center of the upper surface 41b. In the box 41, furthermore, a yoke 42, a magnet 43 and a yoke 44 are housed. The yoke 42 has a disc portion 42a shaped like a disc and a cylinder portion 42b which protrudes upward from a central position of the disc portion 42a and is shaped like a cylinder, with the undersurface of the disc portion 42a being fastened to the bottom surface 41a of the box 41. The magnet 43 is shaped like a cylinder, with the bottom surface of the magnet 43 being fastened to the disc portion 42a of the yoke 42. Furthermore, the cylinder portion 42b of the yoke 42 is pierced through the through hole provided at the central position of the magnet 43. The yoke 44 is also shaped like a cylinder. More specifically, a bottom surface of the yoke 44 is fastened to the magnet 43, while the cylinder portion 42b of the yoke 42 is pierced through a through hole provided at the center of the yoke 44. As a result, magnetic paths are provided as indicated by broken lines in the figure.

The transducer 40 also has a bobbin 45 and the above-described coil 16. The bobbin 45 is shaped like a cylinder, with a disc-shaped cap 46 being fastened to the upper end of the bobbin 45. The bobbin 45 and the cap 46 vibrate the sound board 48 of the piano and a bridge 49 which supports strings which are not shown. An upper surface of the cap 46 is bonded to the undersurface of the sound board 48 with an adhesive, double-faced tape or the like such that the cap 46 is situated immediately below or near the bridge 49 which supports strings which are not shown. Furthermore, the bobbin 45 is pierced through the through hole of the upper surface 41b of the box 41, so that the lower part of the bobbin 45 is inserted into a space provided between the outer periphery of the cylinder portion 42b of the yoke 42 and the inner periphery of the yoke 44. The coil 16 is coiled around the outer periphery of the bobbin 45 to be situated on the magnetic path shown by the broken lines in the figure. Between the outer periphery of the coil 16 and the inner periphery of the yoke 44, a magnetic fluid 47 is interposed.

By this configuration, if a current corresponding to an audio signal is fed through the coil 16, the coil 16 and the bobbin 45 vibrate in a vertical direction shown in the figure to vibrate the sound board 48 and the bridge 49 in accordance with the audio signal, so that a sound signal corresponding to the audio signal is generated by the vibration of the sound board 48. Therefore, the transducer 40 and the sound board 48 serve as a sound signal converting device for converting an audio signal, that is, an electric signal to a sound signal.

FIG. 1 will be explained again. In order to measure the temperatures Tc1 and Tc2 of the coil 16 and to protect the transducer 40 including the coil 16 and its peripheral devices, the piano has a coil temperature sensor 21, an atmosphere temperature sensor 22, an A/D converting circuit 23, a relay circuit (relay switch) 24 and a microcomputer 30.

The coil temperature sensor 21 is configured by a thermal diode temperature sensor, thermistor temperature sensor or the like, and is fastened to the bobbin 45 to be placed near the coil 16 (see FIG. 2). The coil temperature sensor 21 directly senses the temperature Tc1 (that is, a first measured temperature) of the coil 16, and outputs a voltage signal indicative of the temperature Tc1 to the A/D converting circuit 23. The atmosphere temperature sensor 22 is also configured by a thermal diode temperature sensor, thermistor temperature sensor or the like, and is placed in a space where the transducer 40 is placed. The atmosphere temperature sensor 22 directly senses a temperature Ta (that is, an atmosphere temperature Ta) of the space where the transducer 40 is placed, and outputs a voltage signal indicative of the atmosphere temperature Ta to the A/D converting circuit 23.

The A/D converting circuit 23 receives a signal indicative of an application voltage V applied to the coil 16, a detection signal indicative of the coil temperature Tc1 (the first measured temperature) and a detection signal indicative of the atmosphere temperature Ta, converts the signals from analog to digital respectively, and supplies the converted signals to the microcomputer 30 respectively. The relay circuit 24 is provided between the amplifier circuit 15 and the coil 16 to serve as a relay switch which is controlled by the microcomputer 30 to switch between on and off in order to switch between energization and non-energization of the coil 16. The application voltage V supplied to the A/D converting circuit 23 to be applied to the coil 16 is a voltage of a point at which the relay circuit 24 is connected with the coil 16. The microcomputer 30 is formed of a CPU, a ROM, a RAM and the like to receive the application voltage V applied to the coil 16, the coil temperature Tc1 and the atmosphere temperature Ta supplied from the A/D converting circuit 23 to perform calculation of the temperature Tc2 (the second measured temperature) of the coil 16, abnormality judgment of the coil temperatures Tc1 and Tc2, and on/off control of the relay circuit 24 by program processing indicated in FIGS. 3A to 3C. To the microcomputer 30, a display unit 31 is connected.

Figure 5:
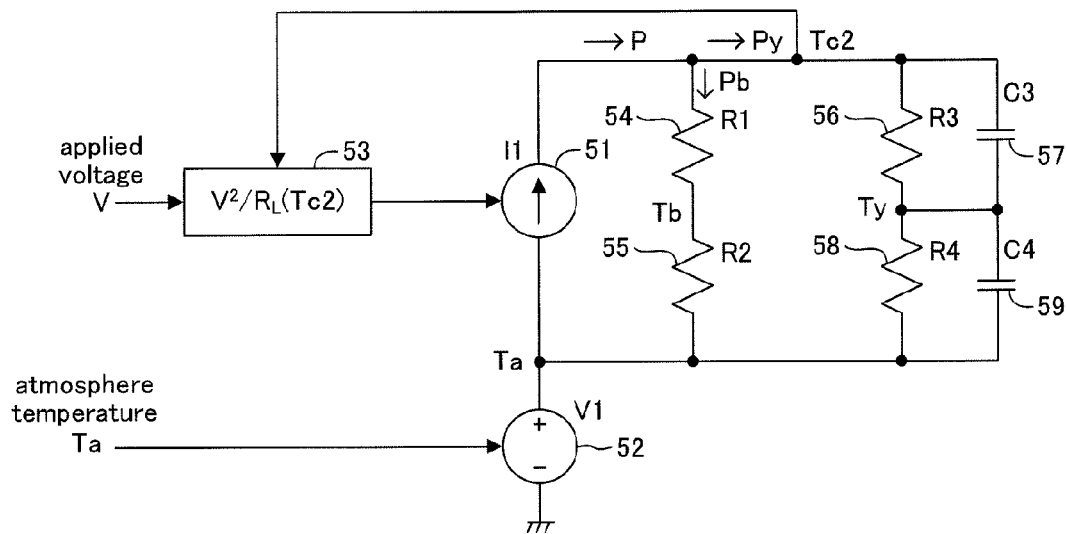
FIG. 5(A) is a diagram indicating a thermal equivalent circuit of a transducer for calculating temperature of the coil shown in FIG. 1.
FIG. 5(B) is a diagram indicating a thermal equivalent circuit of a transducer according to a modification of FIG. 5(A)
Figure 5:
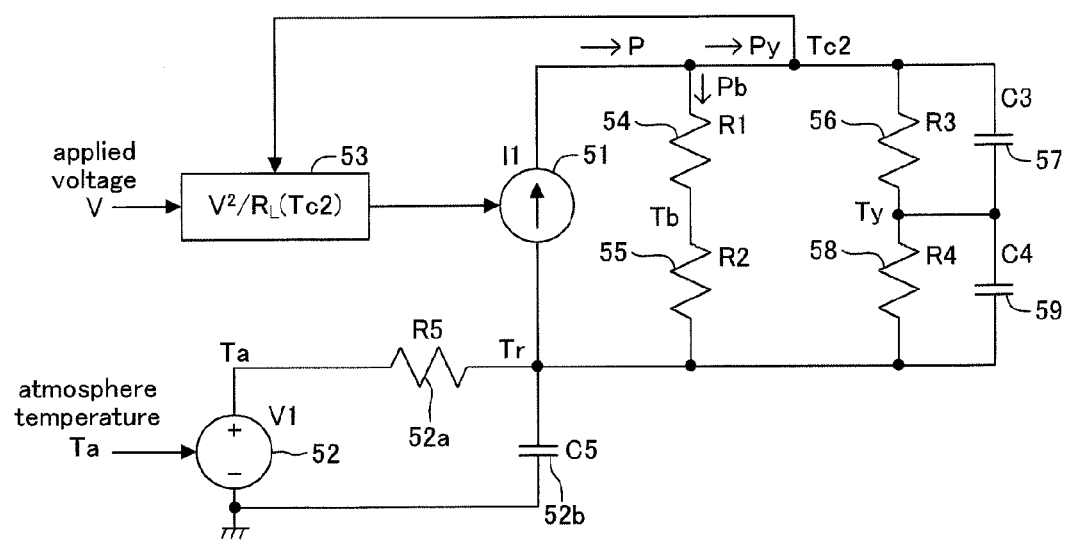

Next, a method of measuring the coil temperature Tc2 (the second measured temperature) will be explained. The measurement of the coil temperature Tc2 is done by calculation based on a thermal equivalent circuit, in consideration of thermal equivalent circuit of the transducer 40. In the thermal equivalent circuit, the magnitude of current (ampere) corresponds to electric power (watt), the magnitude of voltage (volt) corresponds to temperature (deg. C.), the magnitude of resistance (ohm) corresponds to thermal resistance (deg. C./watt), and capacitance of capacitor (farad) corresponds to thermal capacitance (deg. C./joule). FIG. 5(A) indicates a thermal equivalent circuit for calculating coil temperature Tc2 of the transducer 40.

The thermal equivalent circuit will now be explained. The thermal equivalent circuit has a current source 51 and a voltage source 52. The current source 51, which corresponds to a heat source generated by consumption power P of the coil 16, is controlled by a calculating unit 53 for calculating the consumption power P to output a current I1 corresponding to the consumption power P. In this case, assuming that a resistance value of the coil 16 is $R_L(Tc2)$ while a voltage applied to the coil 16 is a voltage V, the consumption power P of the coil 16 is represented as equation 1 shown below. As described in detail later, furthermore, the resistance value $R_L(Tc2)$ of the coil 16 can be represented by a function of the coil temperature Tc2. Therefore, the calculating unit 53 receives the voltage V applied to the coil 16 and the coil temperature Tc2 to figure out the consumption power P of the coil 16 in accordance with the equation 1.

$$P = \frac{V^2}{R_L(Tc2)} \qquad \text{[Equation 1]}$$

The voltage source 52 corresponds to the atmosphere temperature Ta of the transducer 40, and outputs a voltage V1 corresponding to the atmosphere Ta sensed by the atmosphere temperature sensor 22.

Heat generated by the coil 16 is dissipated into atmosphere through the bobbin 45, and is also dissipated into atmosphere through the magnetic fluid 47 and the yoke 44. Furthermore, "Pb" represents a dissipated power dissipated by the bobbin 45, while "Py" represents a dissipated power dissipated through the magnetic fluid 47 and the yoke 44. Therefore, on a current path corresponding to a thermal dissipation path by the bobbin 45 provided between the current source 51 and the voltage source 52, a coil-bobbin thermal resistance 54 and a bobbin thermal dissipation resistance 55 are connected in series. Resistance values of the coil-bobbin thermal resistance 54 and the bobbin thermal dissipation resistance 55 are R1 and R2, respectively. Furthermore, on a current path corresponding to a thermal dissipation path by the magnetic fluid 47 and the yoke 44 provided between the current source 51 and the voltage source 52, a parallel circuit of a magnetic fluid thermal resistance 56 and a magnetic fluid thermal capacitance (magnetic fluid thermal capacitor) 57, and a parallel circuit of a yoke thermal dissipation resistance 58 and a yoke thermal capacitance (yoke thermal capacitor) 59 are connected in series. Resistance values of the magnetic fluid thermal resistance 56 and the yoke thermal dissipation resistance 58 are R3 and R4, respectively. Capacitance values of the magnetic fluid thermal capacitance 57 and the yoke thermal capacitance 59 are C3 and C4, respectively. These resistance values R1, R2, R3 and R4, and the capacitance values C3 and C4 are previously measured known values.

In the thermal equivalent circuit configured as above, therefore, voltage of a connection point between the current source 51, the coin-bobbin thermal resistance 54, the magnetic fluid thermal resistance 56 and the magnetic fluid thermal capacitance 57 corresponds to the coil temperature Tc2. Voltage of a connection point between the coil-bobbin thermal resistance 54 and the bobbin thermal dissipation resistance 55 corresponds to a temperature Tb of the bobbin 45. Voltage of a connection point between the magnetic fluid thermal resistance 56, the magnetic fluid thermal capacitance 57, the yoke thermal dissipation resistance 58 and the yoke thermal capacitance 59 corresponds to a yoke temperature Ty.

Figure 6:
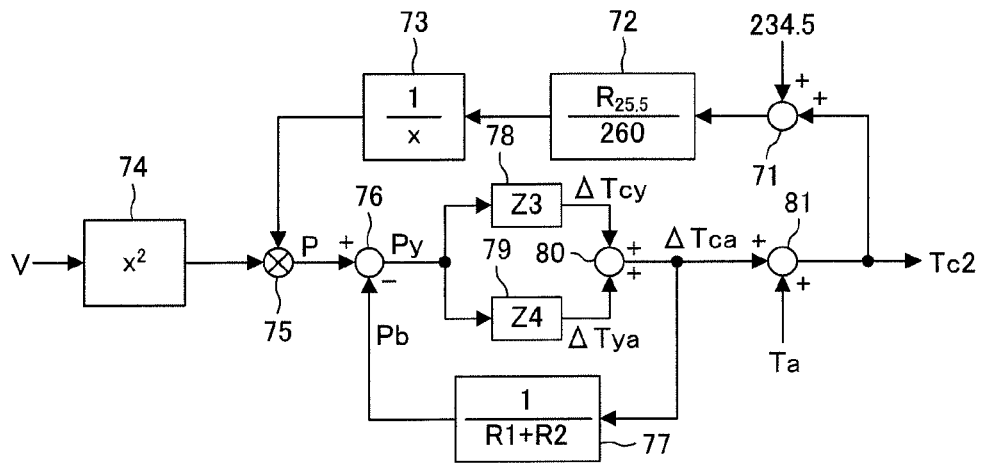
FIG. 6(A) is a block diagram for calculation of coil temperature by the microcomputer on the basis of the thermal equivalent circuit of FIG. 5(A)
FIG. 6(B) is a block diagram for calculation of coil temperature by the microcomputer on the basis of the thermal equivalent circuit of FIG. 5(B)
FIG. 6(C) is a detailed block diagram of some of calculation portions shown in FIGS. 6(A) and (B)
Figure 6:
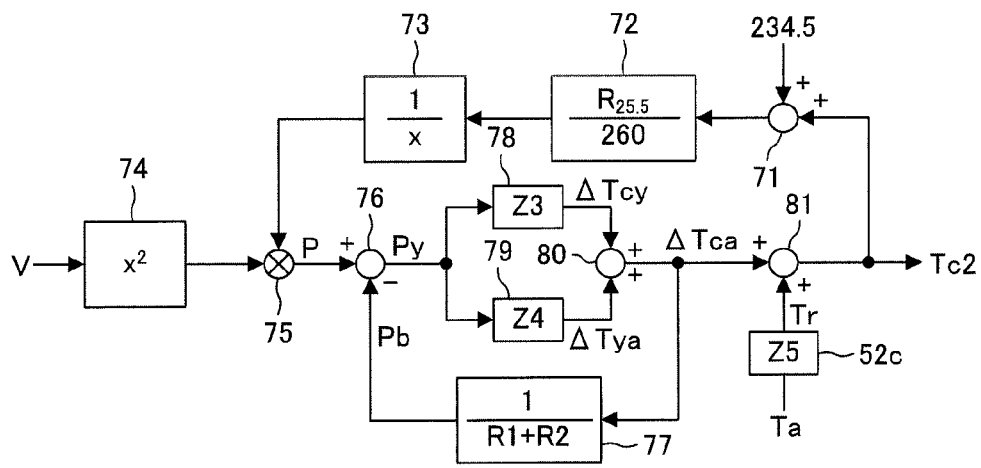
Figure 6:
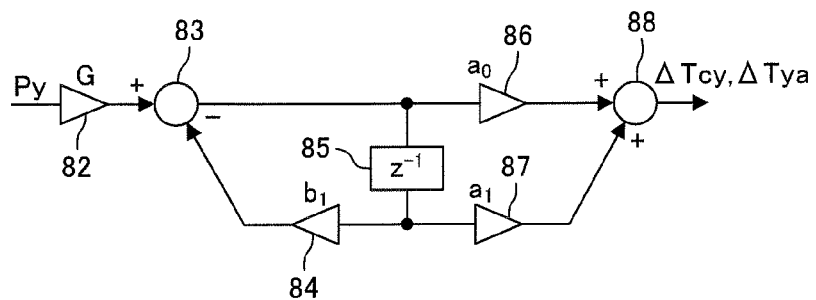

Next, a calculation block for calculating the temperature Ta of the coil 16 by the microcomputer 30 on the basis of this thermal equivalent circuit will be explained. FIG. 6(A) is a calculation block diagram of this calculation, while FIG. 6(C) is a detailed calculation block diagram of calculation portions 78 and 79 shown in FIG. 6(A). In the calculation block diagram of FIG. 6(A), an adding portion 71, a multiplying portion 72, a reciprocal converting portion 73, a square calculating portion 74 and a multiplying portion 75 correspond to the calculating unit 53 and the current source 51 of FIG. 5(A).

The relation between the resistance value $R_L$(Tc2) of the coil 16 and the temperature of the coil 16 will be explained. By a conventionally known resistance method calculating equation, an equation 2 described below can be obtained.

$$\frac{R_{L2}}{R_{L1}} = \frac{234.5 + T2}{234.5 + T1} \quad \text{[Equation 2]}$$

In the above equation 2, T1 represents the temperature of the coil 16 before energization, while $R_{L1}$ represents the resistance value of the coil 16 before energization. T2 represents the temperature of the coil 16 after energization, while $R_{L2}$ represents the resistance value of the coil 16 after energization.

Transforming the equation 2, the resistance value $R_{L2}$ can be expressed as equation 3 described below.

$$R_{L2} = \frac{234.5 + T2}{234.5 + T1} \cdot R_{L1} \quad \text{[Equation 3]}$$

Assuming that the temperature T1 of the coil 16 before energization is 25.5 degrees Celsius, the resistance value $R_{L1}$ of the coil 16 at this temperature T1 (=25.5) is to be measured. Assuming that the resistance value $R_{L1}$ is a value $R_{25.5}$, the equation 3 can be expressed as equation 4 described below.

$$R_{L2} = \frac{R_{25.5}}{260} \cdot (234.5 + T2) \quad \text{[Equation 4]}$$

By performing the equation 4 with the coil temperature Tc2 being given as the temperature T2, the resistance value $R_L$(Tc2)(=$R_{L2}$) of the coil 16 at the coil temperature Tc2 can be figured out.

FIG. 6(A) will be explained again. The operation of the equation 4 corresponds to the calculating processing by the adding portion 71 and the multiplying portion 72. The reciprocal converting portion 73 converts the above-calculated resistance value $R_L$ (Tc2) to a reciprocal. In addition, the square calculating portion 74 squares the input voltage V applied to the coil 16, so that the multiplying portion 75 multiplies the result squared by the square calculating portion 74 by an output from the reciprocal converting portion 73 to output the multiplied result. The calculating processing by the reciprocal converting portion 73, the square calculating portion 74 and the multiplying portion 75 corresponds to the operation of the equation 1. Resultantly, the consumption power P of the coil 16 is to be output from the multiplying portion 75.

A subtracting portion 76 subtracts a multiplication result supplied from a multiplying portion 77 from the multiplication result supplied from the multiplying portion 75, and outputs the subtraction result to the calculation portions 78 and 79. The multiplying portion 77 multiplies value 1/(R1+R2) by an addition result by an adding portion 80. The calculation by the multiplying portion 77 is calculation by dividing voltages of the both ends of the coil-bobbin thermal resistance 54 and the bobbin thermal dissipation resistance 55 by the sum of the resistance value R1 of the coil-bobbin thermal resistance 54 and the resistance value R2 of the bobbin thermal dissipation resistance 55 to figure out the amount of current flowing through the coil-bobbin thermal resistance 54 and the bobbin thermal dissipation resistance 55. Since the current is equivalent to electric power in the thermal equivalent circuit, the calculation result by the multiplying portion 77 is equivalent to the dissipated power Pb by the bobbin 45. Furthermore, since the subtracting portion 76 subtracts the dissipated power Pb by the bobbin 45 from the consumption power P of the coil 16 and outputs the subtracted result, the output from the subtracting portion 76 is equivalent to the dissipated power Py by the magnetic fluid 47 and the yoke 44.

The calculation portion 78 receives a current corresponding to the dissipated power Py by the magnetic fluid 47 and the yoke 44 to figure out the voltages on the both ends of the magnetic fluid thermal resistance 56 and the magnetic fluid thermal capacitance 57, that is, the amount of rise in temperature ΔTcy in the magnetic fluid 47. The calculation portion 79 receives a current corresponding to the dissipated power Py by the magnetic fluid 47 and the yoke 44 to figure out the voltages on the both ends of the yoke thermal dissipation resistance 58 and the yoke thermal capacitance 59, that is, the amount of rise in temperature ΔTya in the yoke 44. The detailed calculation block of the calculation portions 78 and 79 will be explained later with reference to FIG. 6(C). The adding portion 80 adds values output from the calculation portions 78 and 79 together to figure out a combined value ΔTca between the amount of rise in temperature ΔTcy in the magnetic fluid 47 and the amount of rise in temperature ΔTya in the yoke 44, in other words, to figure out voltages on the both ends of the series circuit of the magnetic fluid thermal resistance 56 and the yoke thermal dissipation resistance 58. The output from the adding portion 80 is supplied to an adding portion 81, so that the adding portion 81 adds the atmosphere temperature Ta to the value output from the adding portion 80 to output the added result. As a result, the output from the adding portion 81 indicates the coil temperature Tc2.

Each of the calculation portions 78 and 79 is formed of a gain control portions (multiplying portions) 82, 84, 86 and 87, a delay portion 85, a subtracting portion 83 and an adding portion 88 as indicated in FIG. 6(C). The gain control portion 82 multiplies a gain G by the dissipated power Py, and outputs the multiplied result to the subtracting portion 83. The subtracting portion 83 subtracts a value input from the gain control portion 84 from a value input from the gain control portion 82, and outputs the subtracted result to the gain control portion 86 and the delay portion 85. The delay portion 85 delays the value input from the subtracting portion 83 as a unit delay, and outputs the delayed value to the gain control portions 84 and 87. The gain control portion 84 multiplies a gain $b_1$ by the value input from the delay portion 85 and outputs the multiplied result to the subtracting portion 83. The gain control portion 86 multiplies a gain $a_0$ by the value input from the subtracting portion 83, and outputs the multiplied result to the adding portion 88. The gain control portion 87 multiplies a gain $a_1$ by the value input from the delay portion 85, and outputs the multiplied result to the adding portion 88. The adding portion 88 adds the values input from the gain control portions 86 and 87 together, and outputs the added result.

At the calculation portion 78, assuming that the sampling period of the dissipated power Py is T3, a gain G of the gain control portion 82 is R3·W3/(α3+W3), the gain $b_1$ of the gain control portion 84 is (α3−W3)/(α3+W3), the gain $a_0$ of the gain control portion 86 is "1", and the gain $a_1$ of the gain control portion 87 is "1". The value α3 is 2/T3, while the value W3 is 1/C3·R3. At the calculation portion 79, furthermore, assuming that the sampling period of the dissipated power Py is T4, the gain G of the gain control portion 82 is R4·W4/(α4+W4), the gain $b_1$ of the gain control portion 84 is (α4−W4)/(α4+W4), the gain $a_0$ of the gain control portion 86 is "1", and the gain $a_1$ of the gain control portion 87 is "1". The value α4 is 2/T4, while the value W4 is 1/C4·R4.

In this case, since the resistance values R1, R2, R3 and R4, and the capacitance values C3 and C4 used in the calculation blocks shown in FIG. 6(A) and FIG. 6(C) are known values as described above, the temperature Tc of the coil 16 can be figured out in accordance with the calculation blocks of FIG. 6(A) and FIG. 6(C) by inputting the voltage V applied to the coil 16 and the atmosphere temperature Ta.

Next, behavior of the piano according to the first embodiment configured as above will be explained. When a player operates the keyboard 11 and the pedal 12 for musical performance, the operation of keyboard 11 and the pedal 12 is sensed by the sensor circuit 13, so that a sensing signal representative of the musical performance sensed by the sensor circuit 13 is supplied to the tone generator 14. In accordance with the sensing signal representative of the musical performance, the tone generator 14 outputs an electrical musical tone signal (audio signal) representative of a piano tone to the coil 16 via the amplifier circuit 15 and the relay circuit 24. The relay circuit 24 designed to be controlled to be in the off-state if the coil temperature Tc1 is equal to or higher than a predetermined upper limit temperature (120 degrees Celsius, for example) is programed to be in the on-state at its initial state at least, as described in detail later. Therefore, the voltage signal obtained by amplifying the audio signal with the amplification factor K is fed into the coil 16.

By this voltage signal, a current of the magnitude proportional to the voltage signal is fed through the coil 16. By the current passing through the coil 16, the transducer 40 vibrates the bobbin 45 and the cap 46 in the vertical direction shown in FIG. 2, so that the sound board 48 and the bridge 49 also vibrate in response to the vibration of the bobbin 45 and the cap 46. By the vibration of the sound board 48, therefore, the audio signal is converted to a sound signal, so that the player and audience can hear a musical tone corresponding to the player's operation on the keyboard 11 and the pedal 12. The musical tone brought about by the vibration of the sound board 48 by use of the transducer 40 is a musical instrument tone of a low tone volume, compared to a case where strings are vibrated by a hammer. That is, the musical tone is a softened tone of the musical instrument.

Next, the calculation of the coil temperature Tc2 (the second measured temperature), the abnormal judgment on the coil temperatures Tc1 and Tc2, and the on/off control of the relay circuit 24 by the microcomputer 30 will be explained. In a state where the above-described piano is in operation, the microcomputer 30 repeatedly executes a program indicated in FIG. 3A to FIG. 3C at every predetermined short period of time. The program is started at step S10 shown in FIG. 3A. At step S11, the microcomputer 30 receives the atmosphere temperature Ta sensed by the atmosphere temperature sensor 22 via the A/D converting circuit 23. At step S12, the microcomputer 30 receives the coil temperature Tc1 sensed by the coil temperature sensor 21 via the A/D converting circuit 23. At step S13, the microcomputer 30 receives the voltage V (audio signal) applied to the coil 16 via the A/D converting circuit 23. At step S14, the microcomputer 30 calculates the coil temperature Tc2, using the received atmosphere temperature Ta and the application voltage V. As described above, the calculation of the coil temperature Tc2 is done in accordance with the calculating processing indicated by the calculation blocks of FIGS. 6(A) and (C) based on the thermal equivalent circuit of the transducer 40 shown in FIG. 5(A).

After the above-described step S14, the microcomputer 30 judges at step S15 whether the atmosphere temperature Ta is equal to or higher than 160 degrees Celsius, and judges at step S17 whether the atmosphere temperature Ta is lower than −20 degrees Celsius. At step S19, the microcomputer 30 judges whether the coil temperature Tc1 is equal to or higher than 160 degrees Celsius, and judges at step S21 whether the coil temperature Tc1 is lower than −20 degrees Celsius. At step S23, the microcomputer 30 judges whether the coil temperature Tc2 is equal to or higher than 160 degrees Celsius.

In this case, if the atmosphere temperature Ta is equal to or higher than 160 degrees Celsius, the microcomputer 30 determines "Yes" at step S15, and displays a message saying "the atmosphere temperature sensor is under short-circuit fault" on the display unit 31 at step S16. This is because it is impossible for the atmosphere temperature of the transducer 40 to be "160 degrees Celsius", and it is possible if the atmosphere temperature sensor is under short-circuit fault. Furthermore, if the atmosphere temperature Ta is lower than −20 degrees Celsius, the microcomputer 30 determines "Yes" at step S17, and displays a message saying "the atmosphere temperature sensor 22 is under open fault" on the display unit 31 at step S18. This is because it is impossible for the atmosphere temperature of the transducer 40 to be "−20 degrees Celsius", and it is possible if the atmosphere temperature sensor 22 is under open fault.

Figure 4:
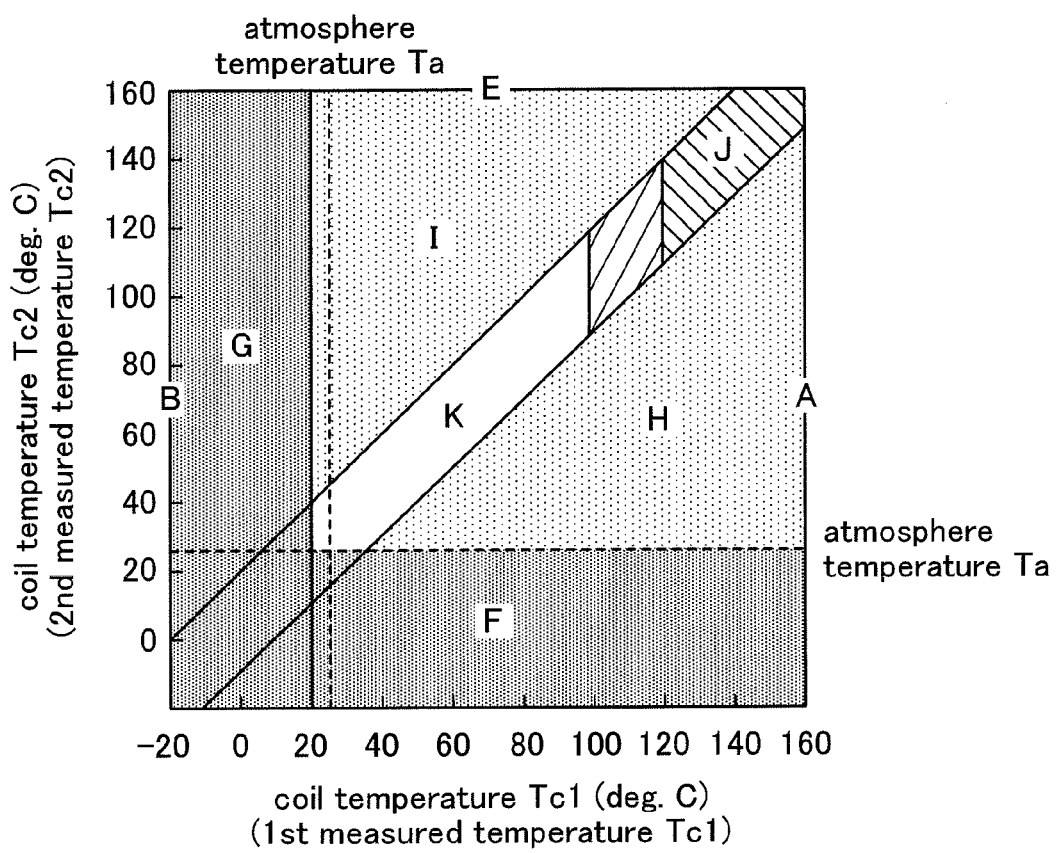
FIG. 4 is a diagram explaining relation between measured temperature of a coil, and states where audio signals are supplied to the coil and where supply of audio signals to the coil is suspended.

Furthermore, if the coil temperature Tc1 is equal to or higher than 160 degrees Celsius (see A of FIG. 4), the microcomputer 30 determines "Yes" at step S19, and displays a message saying "the coil temperature sensor is under short-circuit fault" on the display unit 31 at step S20. This is because it is impossible for the coil 16 to be "160 degrees Celsius", and it is possible if the coil temperature sensor 21 is under short-circuit fault. Furthermore, if the coil temperature Tc1 is lower than −20 degrees Celsius (see B of FIG. 4), the microcomputer 30 determines "Yes" at step S21, and displays a message saying "the coil temperature sensor is under open fault" on the display unit 31 at step S22. This is because it is impossible for the coil 16 to be "−20 degrees Celsius", and it is possible if the coil temperature sensor 21 is under open fault.

Furthermore, if the coil temperature Tc2 is equal to or higher than 160 degrees Celsius (see E of FIG. 4), the microcomputer 30 determines "Yes" at step S23, and displays a message saying "electric power measurement system is under fault conditions" on the display unit 31 at step S24. This is because it is impossible for the coil 16 to be "160 degrees Celsius", and there is an extremely high possibility that the electric power measurement system for use in the calculation of the coil temperature Tc2, that is, the input of the application voltage V is under fault conditions. The above-described temperature values "160 degrees Celsius" and "−20 degrees Celsius" are predetermined temperature values given as examples. Therefore, the temperature values may be any values as long as the temperature values are impossible for the atmosphere temperature Ta and the coil temperatures Tc1 and Tc2.

Figure 3A:
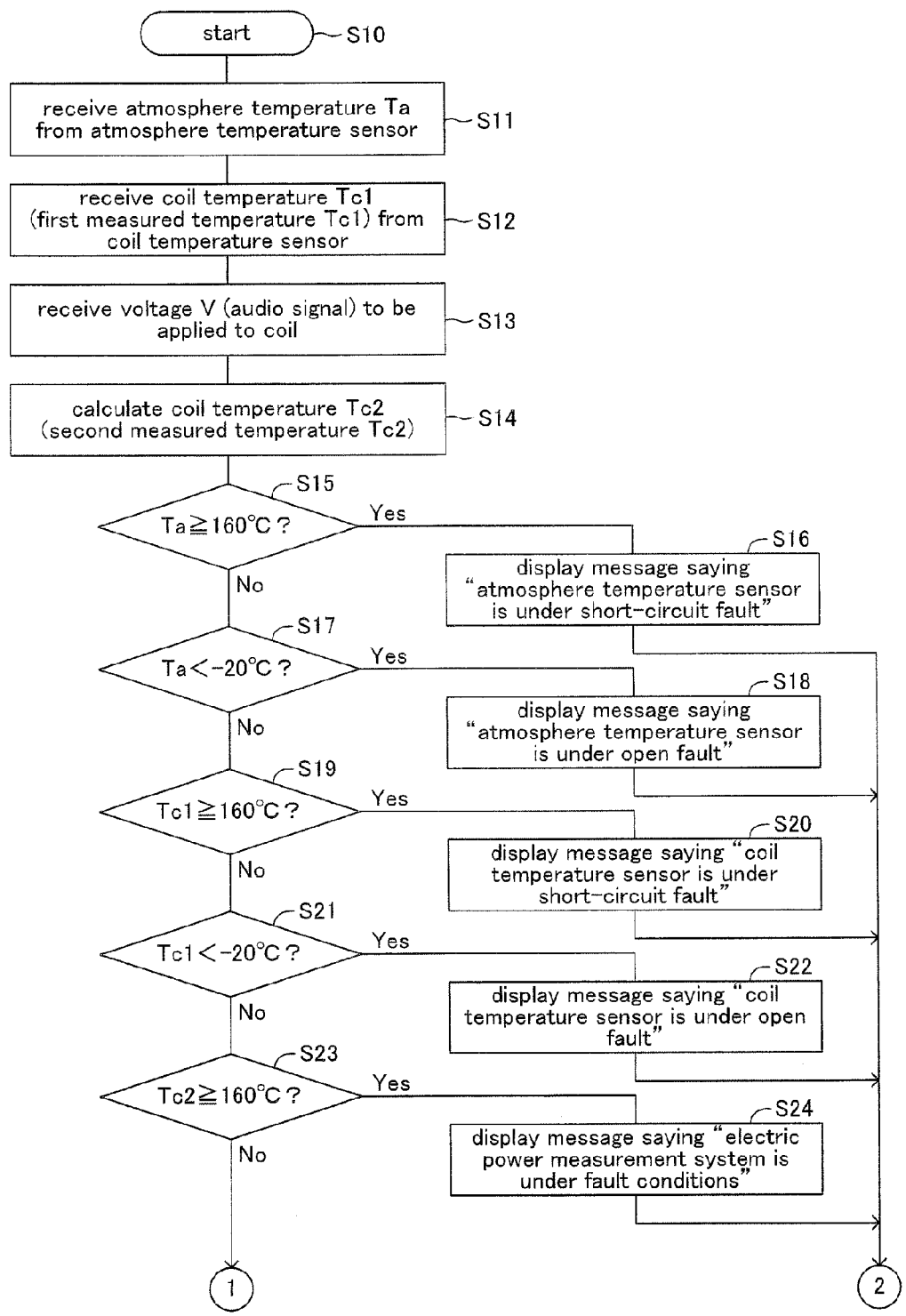
FIG. 3A is the top portion of a flowchart of a program executed by a microcomputer shown in FIG. 1.
Figure 3B:
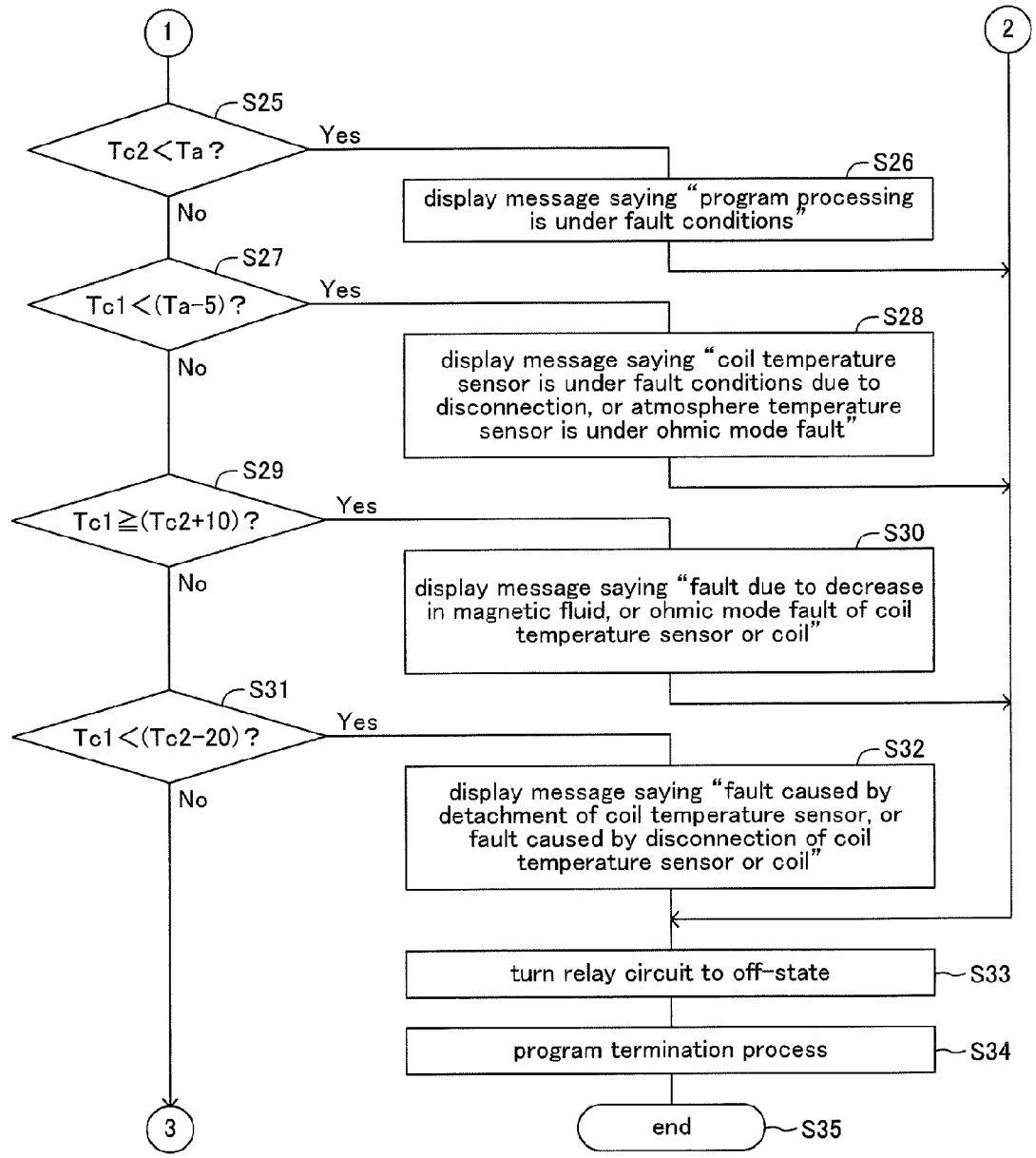
FIG. 3B is a portion of the flowchart, the portion following FIG. 3A.

After the above-described step S16, S18, S20, S22 or S24, the microcomputer 30 turns the relay circuit 24 to the off-state at step S33 of FIG. 3B, executes a program termination process at step 34 to terminate the execution of the program at step S35. In this case, by the switch of the relay circuit 24 to the off-state, the supply of audio signal to the coil 16 is stopped to stop generation of musical tone of the musical instrument by the transducer 40. In this case, furthermore, the automatically repeated execution of the program at the every predetermined short period of time is also stopped.

On the other hand, if the atmosphere temperature Ta is equal to or higher than −20 degrees Celsius and lower than 160 degrees Celsius, the coil temperature Tc1 is equal to or higher than −20 degrees Celsius and lower than 160 degrees Celsius, and the coil temperature Tc2 is lower than 160 degrees Celsius, the microcomputer 30 determines "No" at steps S15, S17, S19, S21 and S23 to proceed to step S25 and later steps shown in FIG. 3B.

The microcomputer 30 judges at step S25 whether the coil temperature Tc2 is lower than the atmosphere temperature Ta, and judges at step S27 whether the coil temperature Tc1 is lower than a temperature value (Ta−5) which is 5 degrees Celsius lower than the atmosphere temperature Ta. Then, the microcomputer 30 judges at step S29 whether the coil temperature Tc1 is equal to or higher than a temperature value (Tc2+10) which is 10 degrees Celsius higher than the coil temperature Tc2, and judges at step S31 whether the coil temperature Tc1 is lower than a temperature value (Tc2−20) which is 20 degrees Celsius lower than the coil temperature Tc2.

In this case, if the coil temperature Tc2 is lower than the atmosphere temperature Ta (see an area F of FIG. 4), the microcomputer 30 determines "Yes" at step S25, and displays a message saying "the program processing is under fault conditions" on the display unit 31 at step S26. This is because the coil temperature Tc2 cannot be lower than the atmosphere temperature Ta, for the coil temperature Tc2 is obtained by adding to the atmosphere temperature Ta by the above-described calculating processing. Therefore, there is an extremely high possibility that the program processing is under fault conditions.

Furthermore, if the coil temperature Tc1 is lower than the temperature value (Ta−5) (see an area G of FIG. 4), the microcomputer 30 determines "Yes" at step S27, and displays a message saying "the coil temperature sensor 21 is under fault conditions due to disconnection, or the atmosphere temperature sensor 22 is under ohmic mode fault (in the middle between open fault and short-circuit fault)" on the display unit 31 at step S28. The temperature value (Ta−5) is adopted, considering that although the coil temperature Tc1 cannot basically be lower than the atmosphere temperature Ta, there is a possibility that there can be a time delay in the coil temperature Tc1 detected by the coil temperature sensor 21 under circumstances where the atmosphere temperature Ta rises abruptly. In this case, there is a high possibility that the fault is caused by disconnection of the coil temperature sensor 21 or ohmic mode fault of the atmosphere temperature sensor 22. The above-described temperature value (Ta−5) is a value given as an example, and may be any other temperature value as long as the temperature value is slightly smaller than the atmosphere temperature Ta.

Furthermore, if the coil temperature Tc1 is equal to or higher than the temperature value Tc2+10 (see an area H of FIG. 4), the microcomputer 30 determines "Yes" at step S29, and displays a message saying "fault due to decrease in magnetic fluid, or ohmic mode fault of coil temperature sensor or coil" on the display unit 31 at step S30. Although the coil temperatures Tc1 and Tc2 are supposed to be the same basically, there can be a slight error between the coil temperatures Tc1 and Tc2. Therefore, a margin of error of 10 degrees Celsius is allowed. As a cause of the fault in this case, there is a high possibility of decrease in the magnetic fluid 47, ohmic mode fault of the coil temperature sensor 21, or ohmic mode fault of the coil 16. The above-described temperature value (Tc2+10) is also a value given as an example, and may be any other temperature value as long as the temperature value is slightly higher than the coil temperature Tc2.

Furthermore, if the coil temperature Tc1 is lower than the temperature value (Tc2−20) (see an area I of FIG. 4), the microcomputer 30 determines "Yes" at step S31, and displays a message saying "fault caused by detachment of coil temperature sensor, or fault caused by disconnection of coil temperature sensor or coil" on the display unit 31 at step S32. As described above, although the coil temperatures Tc1 and Tc2 are supposed to be the same basically, there can be a slight error between the coil temperatures Tc1 and Tc2. In addition, since wind velocity is not considered in the calculation of the coil temperature Tc2, the coil temperature Tc1 measured by the coil temperature sensor 21 may be lower than the coil temperature Tc2 in a case where the piano is used outdoors. Therefore, a margin of error of 20 degrees Celsius is adopted. In this case, there is a high possibility that the fault is caused by detachment of the coil temperature sensor 21 from the bobbin 45, or disconnection of the coil temperature sensor 21 or the coil 16. The above-described temperature value (Tc2−20) is also a value given as an example, and may be any other temperature value as long as the temperature value is slightly smaller than the coil temperature Tc2.

After the above-described steps S26, S28, S30,and S32, the microcomputer 30 executes the above-described steps S33 and S34, and terminates the execution of the program at step S35. In this case as well, the supply of audio signal to the coil 16 is stopped to stop generation of musical tone of the musical instrument by the transducer 40. Furthermore, the automatically repeated execution of the program at the every predetermined short period of time is also stopped.

On the other hand, if the coil temperature Tc2 is equal to or higher than the atmosphere temperature Ta, the coil temperature Tc1 is equal to or higher than the temperature value (Ta−5), the coil temperature Tc1 is lower than the temperature value (Tc2+10), and the coil temperature Tc1 is equal to or higher than the temperature value (Tc2−20), the microcomputer 30 determines "No" at steps S25, S27, S29 and S31, and proceeds to step S36 and later steps of FIG. 3C.

At step S36, the microcomputer 30 judges whether the coil 16 is in the course of cooling-down. The cooling-down indicates a state where the supply of audio signals is interrupted by turning the relay circuit 24 to the off-state, that is, a state where the temperature of the coil 16 is being lowered by suspending the supply of audio signals. During cooling-down, a cooling-down flag is set to ON ("1"). In a non-cooling-down state, that is, in a state where the relay circuit 24 is in the on-state to allow the supply of audio signals to the coil 16, the cooling-down flag is set to OFF ("0").

If the coil 16 is not in the course of cooling-down, the microcomputer 30 determines "No" at step S36, and judges at step S37 whether the coil temperature Tc1 is equal to or higher than 120 degrees Celsius. The temperature value of 120 degrees Celsius is an example temperature value of a case where the coil 16 needs to be protected due to excessive rise in temperature of the coil 16. Therefore, the temperature value can be a different value. If the coil temperature Tc1 is lower than 120 degrees Celsius, the microcomputer 30 determines "no" at step S37, and terminates this program at step S45 after executing steps S43 and S44 which will be explained later. In a case where the program is terminated at step S45, the microcomputer 30 keeps repeatedly executing the process composed of the above-described steps S11 to S44 at each lapse of the predetermined short period of time. In this case, therefore, the relay circuit 24 is kept at the on-state to keep the supply of audio signals to the coil 16 to keep generating musical tones of the musical instrument by the transducer 40.

In such a state, if the coil temperature Tc1 rises to 120 degrees Celsius or more, the microcomputer 30 determines "Yes" at step S37 to turn the relay circuit 24 to the off-state and to set the cooking-down flag to ON ("1") at step S38 to display a message indicating that the piano is in the course of cooling-down on the display unit 31 at step S39 to temporarily terminate the program at step S45 after executing the steps S43 and S44. In this state, the supply of audio signals to the coil 16 is interrupted by the relay circuit 24 to stop generation of musical tones of the musical instrument by the transducer 40.

At the next execution of this program, since the cooling-down flag is in the on-state ("1"), the microcomputer 30 determines "Yes" at step S36, and judges at step S40 whether the coil temperature Tc1 is lower than 100 degrees Celsius. The temperature value of 100 degrees Celsius is an example temperature value at which it can be considered that the temperature of the coil 16 has been lowered adequately, so that the coil 16 need not to be protected. Therefore, a different temperature value which is lower than 120 degrees Celsius may be adopted. If the coil temperature Tc1 is equal to or higher than 100 degrees Celsius, the microcomputer 30 determines "No" at step S40, and temporarily terminates the execution of the program at step S45 after executing the steps S43 and S44. In such a state, since the supply of audio signal to the coil 16 is stopped, the temperature of the coil 16 gradually decreases. Even during the cooling-down, the program composed of the above-described steps S10 to S44 is repeatedly executed, with the application voltage V received at step S13 being "0".

If the coil temperature Tc1 is lowered to be below 100 degrees Celsius by the suspension of supply of audio signal to the coil 16, the microcomputer 30 determines "Yes" at step S40, and turns the relay circuit 24 to the on-state and sets the cooling-down flag to OFF ("0") at step S41, cancels the display indicating that the piano is in the course of cooling-down on the display unit 31 at step S42, and temporarily terminates the program at step S45 after executing the steps S43 and S44. In this state, the supply of audio signal to the coil 16 is started to start generation of musical tones of the musical instrument by the transducer 40. As described above, furthermore, the microcomputer 30 starts determining "No" at steps S36 and S37.

Next, steps S43 and S44 will be explained. The microcomputer 30 judges at step S43 whether the atmosphere temperature Ta is equal to or higher than 40 degrees Celsius, or lower than −10 degrees Celsius. If the atmosphere temperature Ta is not equal to or higher than 40 degrees Celsius, or is not lower than −10 degrees Celsius, the microcomputer 30 determines "No" at step S43 and does not execute step S44. If the atmosphere temperature Ta is equal to or higher than 40 degrees Celsius or is lower than −10 degrees Celsius, the microcomputer 30 determines "Yes" at step S43, and displays a warning indicative of "being out of range of acceptable temperature values" on the display unit 31 at step S44. The warning is given in order to warn a user that the transducer 40 should not be used for the above-described generation of musical tones of the musical instrument under such an environment. Since the temperature values of 40 degrees Celsius and −10 degrees Celsius are also example values, different temperature values which are inadequate for the use of the transducer 40 may be adopted.

In the first embodiment operating as described above, the coil temperature Tc1 is sensed by the coil temperature sensor 21 as the first measured temperature, while the coil temperature Tc2 is calculated as the second measured temperature by use of the voltage V applied to the coil 16 and the atmosphere temperature Ta on the basis of the thermal equivalent circuit of the transducer 40 by step S14 executed by the microcomputer 30. By the steps S36 to S38, S40 and S41, furthermore, if the coil temperature Tc1 excessively rises to exceed the predetermined temperature value (120 degrees Celsius), the relay circuit 24 is turned off to suspend the supply of audio signal to the coil 16. If the coil temperature Tc1 decreases to be below the predetermined temperature value (100 degrees Celsius) in the state where the supply of audio signal is suspended, the relay circuit 24 is turned on to resume the supply of audio signal to the coil 16. As a result, the first embodiment can prevent the coil 16 from excessive rise in temperature to protect the coil 16 and its peripheral devices.

By the steps S29 to S33, furthermore, if the difference between the coil temperatures Tc1 and Tc2 is outside the predetermined range, it is judged that the measurement means for measuring the coil temperatures Tc1 and Tc2 is under fault conditions to display the type of the fault on the display unit 31 and to turn off the relay circuit 24 to suspend the supply of audio signal to the coil 16. By the steps S19 to S24 and S33, furthermore, if the coil temperatures Tc1 and Tc2 are outside their respective predetermined ranges, it is judged that the measurement means for measuring the coil temperatures Tc1 and Tc2 is under fault conditions to display the type of the fault on the display unit 31 and to turn off the relay circuit 24 to suspend the supply of audio signal to the coil 16. As a result, the first embodiment can enhance reliability of the measured coil temperatures Tc1 and Tc2 to protect the coil 16 and its peripheral devices more appropriately. Furthermore, since the type of fault is displayed on the display unit 31, the first embodiment allows a user to appropriately cope with the fault.

Furthermore, if the atmosphere temperature Ta of the transducer 40, that is, the coil 16 is sensed by the atmosphere temperature sensor 22 to find out that measured coil temperatures Tc1 and Tc2 are outside the predetermined range with respect to the atmosphere temperature Ta, it is judged that the measurement means of the coil temperatures Tc1 and Tc2, or the atmosphere temperature Ta is under fault conditions to display the type of the fault on the display unit 31 and to turn off the relay circuit 24 to suspend the supply of audio signal to the coil 16 by the steps S25 to S28 and S33. By the steps S15 to S18, and S33, furthermore, if the atmosphere temperature Ta is outside the predetermined range, it is judged that atmosphere sensor 22 is under fault conditions to display the type of the fault on the display unit 31 and to turn off the relay circuit 24 to suspend the supply of audio signal to the coil 16. As a result, the first embodiment can enhance reliability of the measured coil temperatures Tc1 and Tc2 and reliability of the atmosphere temperature Ta to protect the coil 16 and its peripheral devices more appropriately. In this case as well, furthermore, since the type of fault is displayed on the display unit 31, the first embodiment allows a user to appropriately cope with the fault.

In the first embodiment, on the precondition that the atmosphere temperature sensor 22 is placed near the transducer 40, the coil temperature Tc2 is calculated, considering that the atmosphere temperature Ta sensed by the atmosphere temperature sensor 22 is the atmosphere temperature of the transducer 40. In a case where the atmosphere temperature sensor 22 is not located near the transducer 40, however, the atmosphere temperature Ta sensed by the atmosphere temperature sensor 22 may not be able to be treated as the atmosphere temperature of the transducer 40. More specifically, there can be cases where the atmosphere temperature sensor 22 and the transducer 40 are apart from each other, so that there can be a slight difference in temperature between an air temperature Ta of the position of the atmosphere temperature sensor 22 and an air temperature Tr of the position of the transducer 40.

In this case, in consideration of the space between the atmosphere temperature sensor 22 and the transducer 40, the thermal equivalent circuit shown in FIG. 5(A) is modified to a circuit shown in FIG. 5(B). In the thermal equivalent circuit shown in FIG. 5(B), more specifically, a low-pass filter formed of a thermal resistance 52$a$ of the air situated between the atmosphere temperature sensor 22 and the transducer 40 and a thermal capacitance 52$b$ of the air situated between the atmosphere temperature sensor 22 and the transducer 40 is added in between the current source 51 and the voltage source 52, with respect to the thermal equivalent circuit shown in FIG. 5(A). In this case, the resistance value of the thermal resistance 52$a$ is R5, while the thermal capacitance 52$b$ is C5. Both values are previously measured known values.

A calculation block diagram corresponding to the thermal equivalent circuit shown in FIG. 5(B) is indicated in FIG. 6(B). In the calculation block diagram of FIG. 6(B), the air temperature Ta of the position of the atmosphere temperature sensor 22 is calculated by a calculation portion 52$c$ to be supplied to the adding portion 81 as the air temperature Tr of the position of the transducer 40. As for the other portions, this calculation block diagram is configured similarly to the above-described calculation block diagram shown in FIG. 6(A). Similarly to the above-described calculation portions 78 and 79, the calculation portion 52$c$ is configured as shown in FIG. 6(C). In FIG. 6(C), in this case, assuming that the sampling period of the air temperature Ta of the position of the atmosphere temperature sensor 22 is T5, the gain G of the gain control portion 82 is R5·W5/($\alpha$5+W5), the gain $b_1$ of the gain control portion 84 is ($\alpha$5−W5)/($\alpha$5+W5), the gain $a_0$ of the gain control portion 86 is "1", and the gain $a_1$ of the gain control portion 87 is "1". The value $\alpha$5 is 2/T5, while the value W5 is 1/C5·R5. In this case as well, since the resistance value R5 and the capacitance value C5 used in the calculation blocks shown in FIG. 6(B) and FIG. 6(C) are known values as described above, the coil temperature Tc2 can be figured out in accordance with the calculation blocks of FIG. 6(B) and FIG. 6(C) by inputting the voltage V applied to the coil 16 and the atmosphere temperature Ta.

Figure 3C:
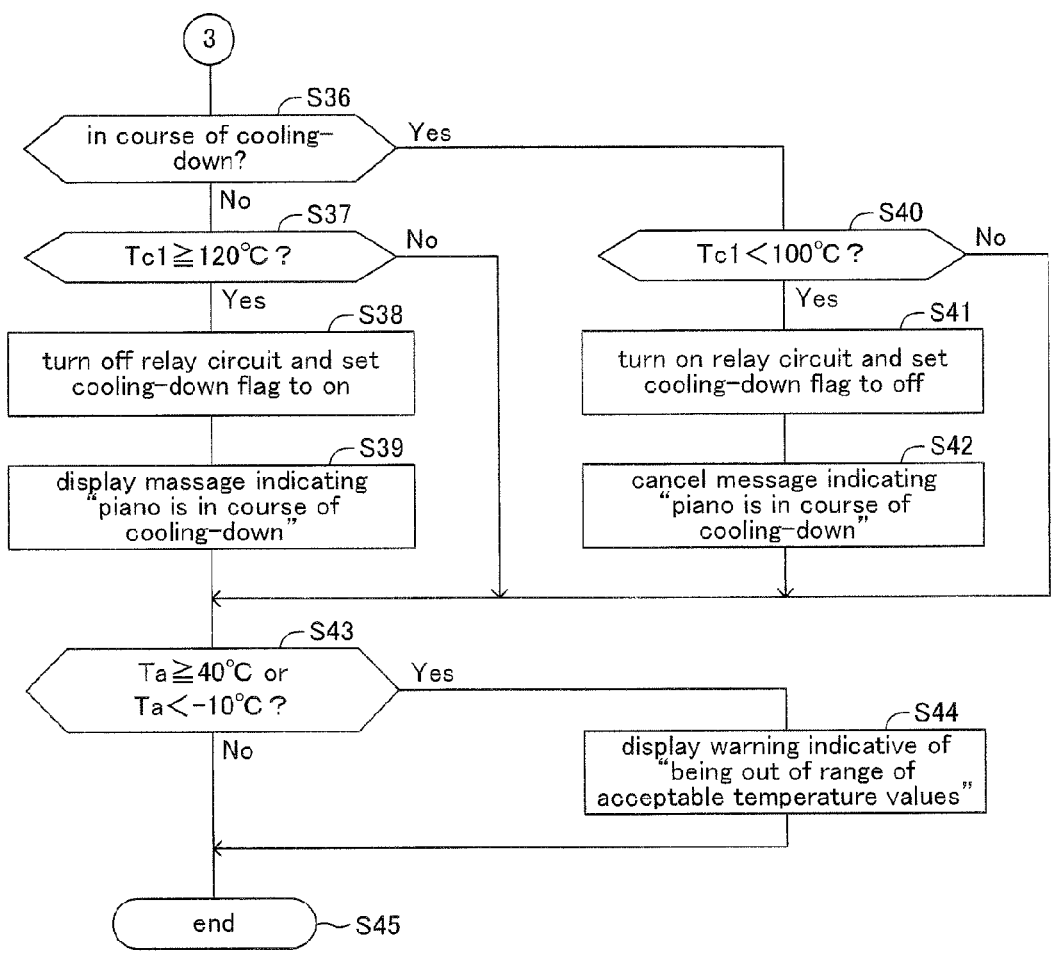
FIG. 3C is a portion of the flowchart, the portion following FIG. 3B.

In this modification as well, the microcomputer 30 executes the program shown in FIG. 3A to FIG. 3C, similarly to the case of the first embodiment. In this modification, however, at step S14, the coil temperature Tc2 is calculated in accordance with the calculation blocks shown in FIG. 6(B) and FIG. 6(C). In this modification, therefore, even though the atmosphere temperature sensor 22 and the transducer 40 are apart from each other to result in a difference between the air temperature Ta of the position of the atmosphere temperature sensor 22 and the air temperature Tr of the position of the transducer 40, the coil temperature Tc2 can be accurately figured out because of the consideration of the difference in air temperatures being given to calculation of the coil temperature Tc2.

a1. Modification

Next, the first modification of the first embodiment will be explained. In the first modification, the calculation of the coil temperature Tc2 which is the second measured temperature is different from that of the first embodiment. In the first modification, only the calculation of the coil temperature Tc2 which is the second measured temperature is different from the first embodiment. The electronic circuit of the piano according to the first modification is also configured similarly to the schematic block diagram of the first embodiment shown in FIG. 1. Furthermore, the transducer 40 of the piano according to the first modification is also configured similarly to the transducer of the first embodiment shown in FIG. 2. The first modification is configured such that only the thermal equivalent circuit for calculating the coil temperature Tc2 and the calculation block for calculating the coil temperature Tc2 on the basis of the thermal equivalent circuit are different from those of the first embodiment, while the other portions of the first modification are the same as the first embodiment. In explanation for the first modification, therefore, only those which are different from the first embodiment will be explained, while the similar portions will be given the same numerical references as those of the first embodiment to omit explanation about the portions.

Figure 7:
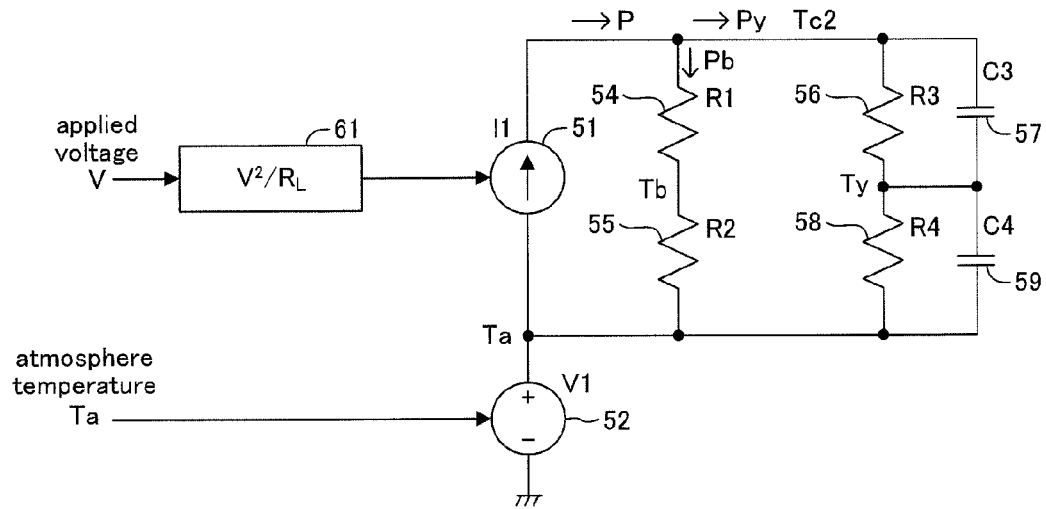
FIG. 7(A) is a diagram indicating a thermal equivalent circuit of a transducer for calculating temperature of the coil according to the first modification of the first embodiment, the circuit being obtained by modifying the thermal equivalent circuit of FIG. 4(A)
FIG. 7(B) is a diagram indicating a thermal equivalent circuit of a transducer according to a modification of FIG. 7(A)
Figure 7:
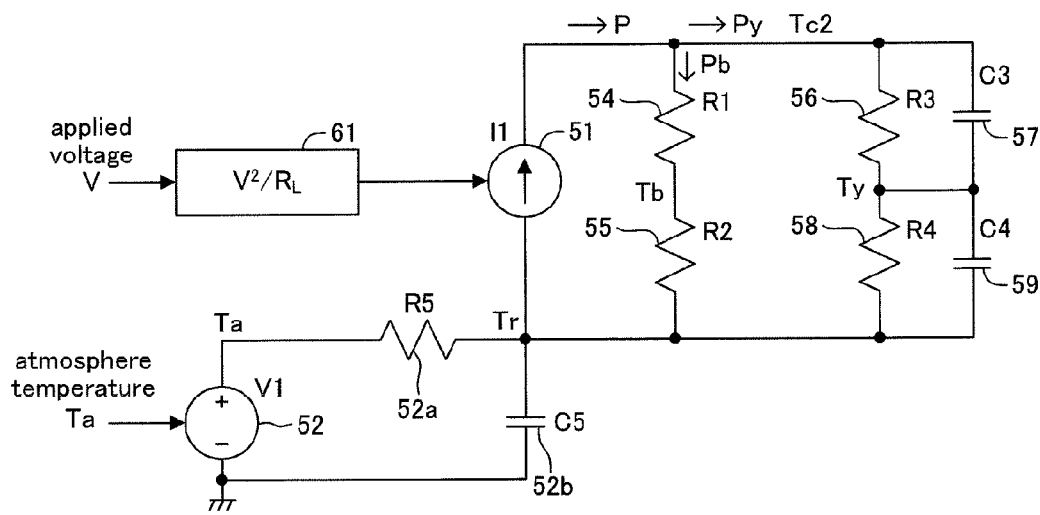

In the first modification, it is assumed that the resistance value $R_L$ of the coil 16 is constant, with changes in the resistance value $R_L$ of the coil 16 caused by changes in the coil temperature Tc2 being ignored. In the thermal equivalent circuit of the transducer 40, therefore, as indicated in FIG. 7(A), a feedback path of the coil temperature Tc2 of the first embodiment is omitted, while a calculating unit 61 is provided instead of the calculating unit 53 provided in the first embodiment. The calculating unit 61 receives only the voltage V applied to the coil 16 to calculate the consumption power P of the coil 16 in accordance with an equation 5 described below. The resistance value $R_L$ of this case is a previously measured known value. The other configuration of the first modification is similar to the first embodiment.

$$P = \frac{V^2}{R_L} \quad \text{[Equation 5]}$$

Figure 8:
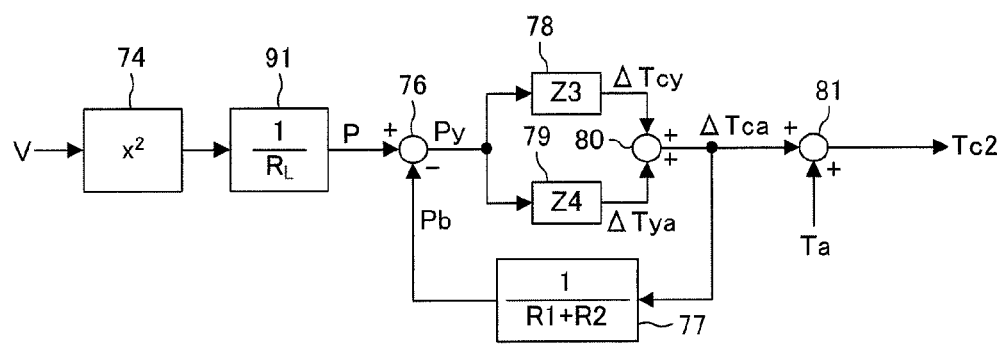
FIG. 8(A) is a block diagram for calculation of coil temperature by the microcomputer on the basis of the thermal equivalent circuit of FIG. 7(A)
FIG. 8(B) is a block diagram for calculation of coil temperature by the microcomputer on the basis of the thermal equivalent circuit of FIG. 7(B)
Figure 8:
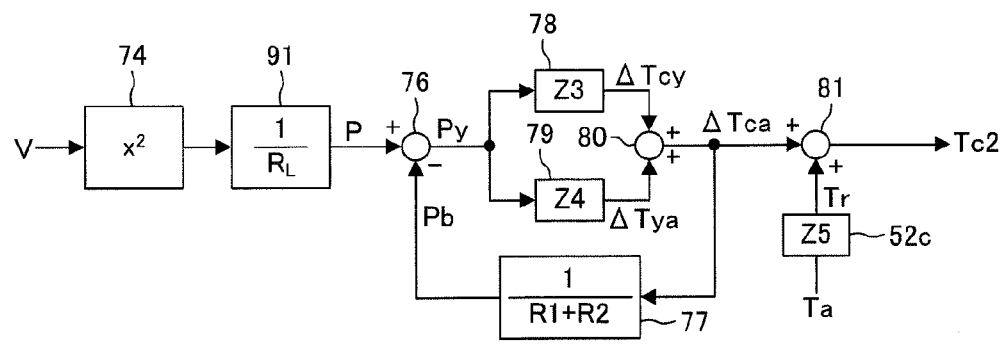

A calculation block for calculating the coil temperature Tc2 based on this thermal equivalent circuit is shown in FIG. 8(A). In this calculation block, more specifically, the adding portion 71, the multiplying portion 72 and the reciprocal converting portion 73 provided in the calculation block of the first embodiment shown in FIG. 6(A) are omitted, while a calculation portion 91 related to the calculating unit 61 of FIG. 7(A) is provided instead of the multiplying portion 75. The calculation portion 91 calculates the consumption power P of the coil 16 by dividing a square value $V^2$ of the voltage V input from the square calculating portion 74 by the resistance value $R_L$ of the coil 16, and outputs the obtained consumption power P to the subtracting portion 76. The other parts of the calculation block are similar to the first embodiment.

The operation of the first modification configured as above will be explained. In the first modification as well, the microcomputer 30 executes the program shown in FIG. 3A to FIG. 3C. At step S14, the coil temperature Tc2 is calculated by a method which is different from that of the first embodiment. In this modification, the coil temperature Tc2 is figured out by use of the application voltage V and the atmosphere temperature Ta in accordance with the calculation block shown in FIG. 8(A). Since the other steps of FIGS. 3A to 3C are done similarly to the case of the first embodiment, the explanation about the other steps will be omitted.

In the first modification as well, the microcomputer 30 receives the voltage V applied to the coil 16 and the atmosphere temperature Ta sensed by the atmosphere temperature sensor 22, and calculates the coil temperature Tc2 (the second measured temperature) by use of the received application voltage V and atmosphere temperature Ta. As described above, in the calculation of the coil temperature Tc2, however, consumption power P of the coil 16 is calculated in accordance with the calculation block shown in FIG. 8(A), that is, with the resistance value $R_L$ of the coil 16 being used as a fixed value. According to the first modification, therefore, since changes in the resistance value $R_L$ (Tc2) of the coil 16 caused by changes in the temperature Tc2 are ignored, the calculation of the coil temperature T2 is simplified, compared with the first embodiment, although the accuracy of the coil temperature Tc2 is degraded in some degree, compared with the first embodiment.

In the first modification as well, on the precondition that the atmosphere temperature sensor 22 is placed near the transducer 40, the coil temperature Tc2 is calculated, considering that the air temperature sensed by the atmosphere temperature sensor 22 is defined as the atmosphere temperature Ta of the transducer 40. In this modification as well, however, there can be cases where the atmosphere temperature sensor 22 and the transducer 40 are apart from each other, so that there can be a slight difference in temperature between the air temperature Ta of the position of the atmosphere temperature sensor 22 and the air temperature Tr of the position of the transducer 40. In such cases as well, therefore, in consideration of the space between the atmosphere temperature sensor 22 and the transducer 40, the thermal equivalent circuit shown in FIG. 7(A) is modified to a circuit shown in FIG. 7(B), while the calculation block diagram shown in FIG. 6(A) is modified to the calculation block diagram shown in FIG. 8(B). Since the above-described modification is similar to the case of the thermal equivalent circuit of FIG. 5(B) and the calculation block diagram of FIG. 6(B) of the modification of the first embodiment, components of the above-described modification are given the same numerical references as those of the modification of the first embodiment to omit explanation about the components.

The microcomputer 30 calculates the coil temperature Tc2 in accordance with the calculation block shown in FIG. 8(B) according to the above-described modification. In this modification as well, therefore, even though the atmosphere temperature sensor 22 and the transducer 40 are apart from each other to result in a difference between the air temperature Ta of the position of the atmosphere temperature sensor 22 and the air temperature Tr of the position of the transducer 40, the coil temperature Tc2 can be accurately figured out because of the consideration of the difference in air temperature being given to calculation of the coil temperature Tc2.

a2. Second Modification

Figure 9:
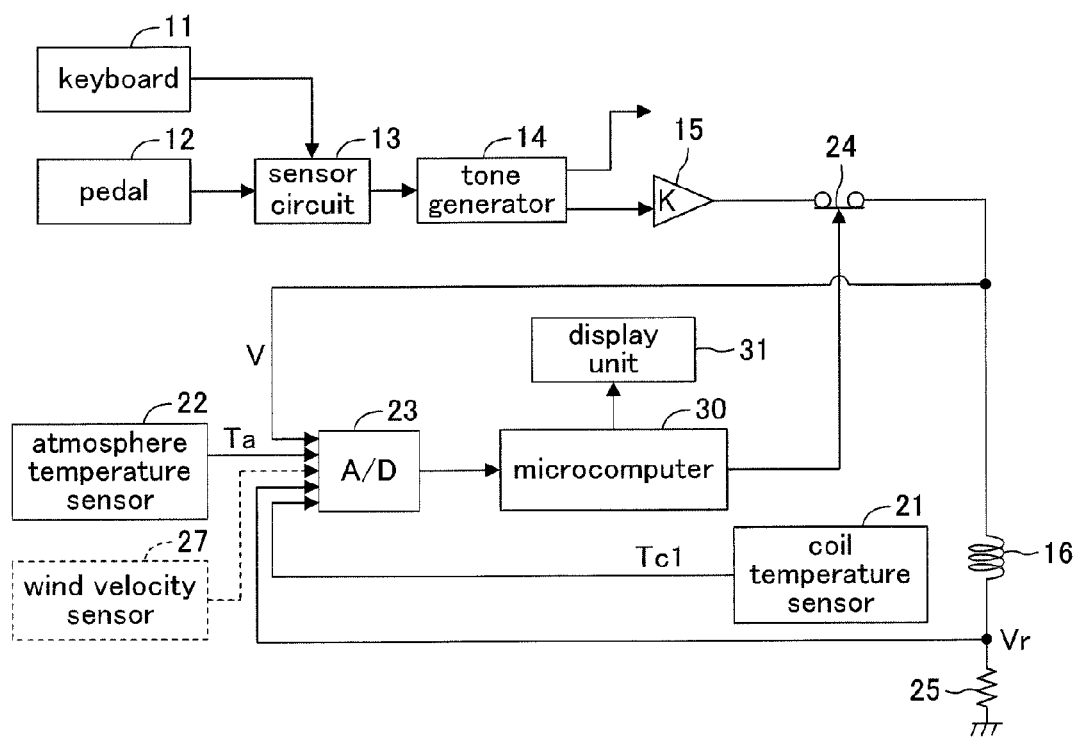
FIG. 9 is a schematic block diagram indicating an electronic circuit embedded in a piano in order to vibrate a sound board according to the second modification of the first embodiment.

Next, the second modification of the first embodiment will be explained. In the second modification, the calculation of the coil temperature Tc2 which is the second measured temperature is further modified from that of the first embodiment. The electronic circuit of the piano according to the second modification is configured as indicated in FIG. 9 such that a resistance 25 which is provided in order to detect current and has a predetermined small resistance value "r" is provided between the coil 16 and the ground, unlike the first embodiment indicated in FIG. 1. A voltage Vr of a point where the resistance 25 is connected with the coil 16 (that is, a terminal voltage Vr of the resistance 25) is to be supplied to the A/D converting circuit 23. Since the resistance value "r" of the resistance 25 is small, the resistance value "r" will not affect the voltage V applied to the coil 16. The A/D converting circuit 23 converts not only signals indicative of the coil temperature Tc1 sensed by the coil temperature sensor 21, the voltage V applied to the coil 16 and the atmosphere temperature Ta sensed by the atmosphere temperature sensor 22 of the first embodiment, but also the terminal voltage Vr of the resistance 25 from analog to digital, and then supplies the converted signals and voltage to the microcomputer 30. The other portions of this electronic circuit are configured similarly to the case of the first embodiment. In addition, the transducer 40 of the piano according to the second modification is also configured similarly to the transducer of the first embodiment shown in FIG. 2. As for the second modification as well, therefore, only the points which are different from the first embodiment will be explained, with the similar portions being given the same numerical references as the first embodiment to omit explanations about the similar portions.

Figure 10:
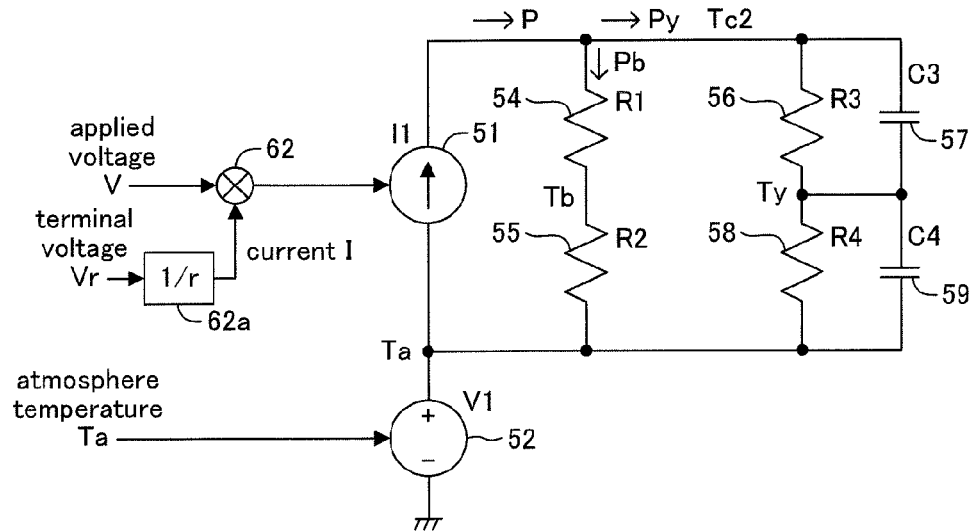
FIG. 10(A) is a diagram indicating a thermal equivalent circuit of a transducer for calculating temperature of the coil shown in FIG. 9 according to the second modification of the first embodiment.
FIG. 10(B) is a diagram indicating a thermal equivalent circuit of a transducer according to a modification of FIG. 10(A)
Figure 10:
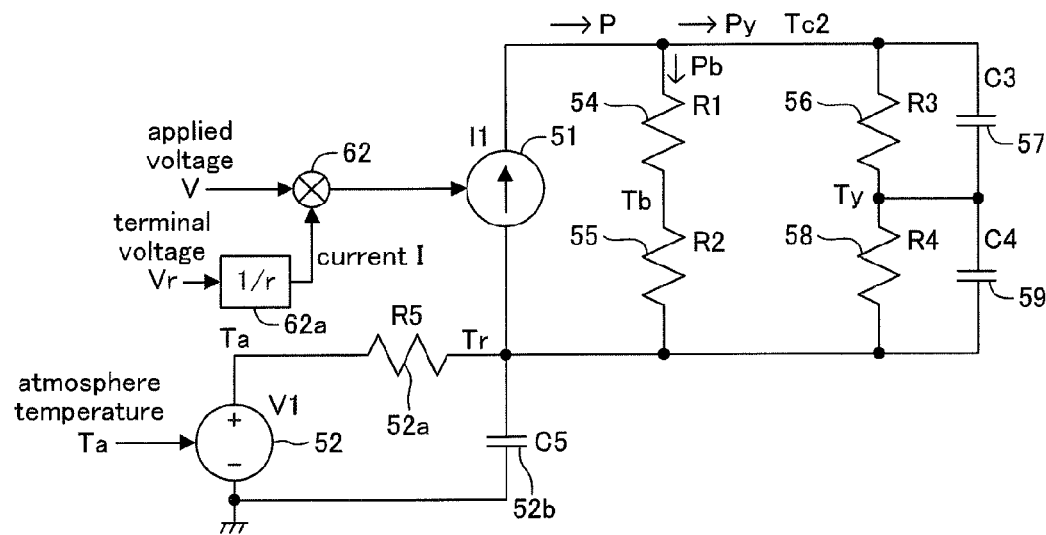

In the thermal equivalent circuit of the transducer 40 for calculating the coil temperature Tc2 in the second modification, the feedback path of the coil temperature Tc2 in the first embodiment is omitted, while the calculating unit 53 of the first embodiment is replaced with a multiplier 62 as indicated in FIG. 10(A). The multiplier 62 receives the voltage V which is to be applied to the coil 16 and current I which is to flow through the coil 16 and is calculated by a divider 62a, and calculates the consumption power P of the coil 16 in accordance with an equation 6 described below. A divider 62a divides the terminal voltage Vr of the resistance 25 by the resistance value r of the resistance 25 to obtain the current I flowing through the coil 16. In a case where a resistance having a resistance value r serving as a standard of reference by which the terminal voltage Vr can be considered as the current I can be used, or in a case where the terminal voltage Vr can be substantially considered as the current I flowing through the coil 16 by later calculating processing, the divider 62a may be omitted. The other portions of the second modification are configured similarly to the first embodiment.

$$P = V \cdot I \quad \text{[Equation 6]}$$

Figure 11:
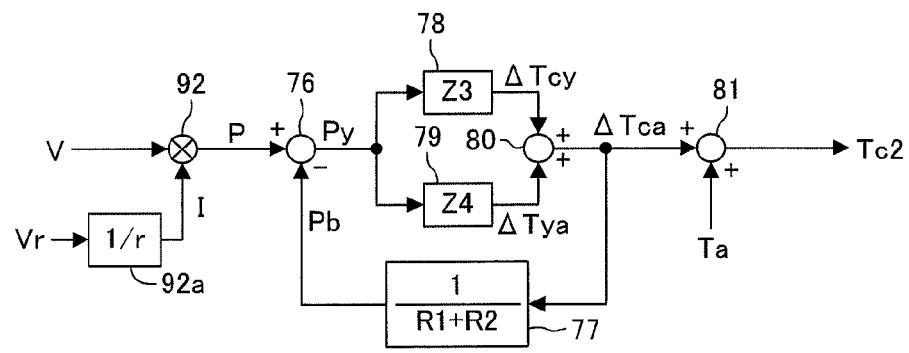
FIG. 11(A) is a block diagram for calculation of coil temperature by the microcomputer on the basis of the thermal equivalent circuit of FIG. 10(A)
FIG. 11(B) is a block diagram for calculation of coil temperature by the microcomputer on the basis of the thermal equivalent circuit of FIG. 10(B)
Figure 11:
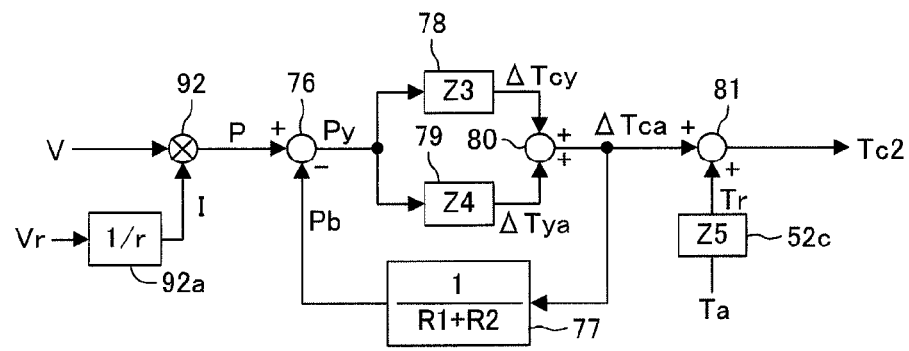

The calculation block for calculating the coil temperature Tc2 on the basis of this thermal equivalent circuit is indicated in FIG. 11(A). In this calculation block, more specifically, the adding portion 71, the multiplying portion 72 and the reciprocal converting portion 73 provided in the calculation block of the first embodiment shown in FIG. 6(A) are omitted, while the square calculating portion 74 and the multiplying portion 75 are replaced with a multiplying portion 92 and a dividing portion 92a corresponding to the multiplier 62 and the divider 62a, respectively, of FIG. 10(A). The dividing portion 92a divides the terminal voltage Vr by the resistance value r to figure out the current value I. The multiplying portion 92 multiplies the voltage value V by the current value I to figure out the consumption power P, and outputs the obtained consumption power P to the subtracting portion 76. The other portions of the calculation block are similar to the first embodiment.

The operation of the second modification configured as above will be explained. In the second modification as well, the microcomputer 30 executes the program indicated in FIG. 3A to FIG. 3C. In the program, at step S13 of the first embodiment, not only the application voltage V but also the terminal voltage Vr (substantially indicative of the current value I) are received, while the coil temperature Tc2 is calculated at step S14 by a method which is different from that of the first embodiment. In the second modification, the coil temperature Tc2 is calculated by use of the application voltage V, the terminal voltage Vr (substantially indicative of the current value I) and the atmosphere temperature Ta in accordance with the calculation block shown in FIG. 11(A). Since the other steps of FIGS. 3A to 3C are done similarly to the first embodiment, the explanations about the other steps are omitted.

In the second modification as well, the microcomputer 30 receives the voltage V applied to the coil 16, the terminal voltage Vr of the resistance 25 (substantially indicative of the current value I flowing through the coil 16) and the atmosphere temperature Ta sensed by the atmosphere temperature sensor 22, and calculates the coil temperature Tc2 (the second measured temperature) by use of the received application voltage V, terminal voltage Vr (substantially indicative of the current value I flowing through the coil 16) and atmosphere temperature Ta. As described above, however, the coil temperature Tc2 is calculated by use of the application voltage V, terminal voltage Vr (substantially indicative of the current value I flowing through the coil 16) and atmosphere temperature Ta in accordance with the calculation block shown in FIG. 11(A). According to the second modification, therefore, although the current value I flowing through the coil 16 needs to be detected, the calculation of the coil temperature T2 is simplified as in the case of the first modification, for the detection of the current value I can be achieved by a simple configuration.

In the second modification as well, on the precondition that the atmosphere temperature sensor 22 is placed near the transducer 40, the coil temperature Tc2 is calculated, considering that the air temperature sensed by the atmosphere temperature sensor 22 is defined as the atmosphere temperature Ta of the transducer 40. In this modification as well, however, there can be cases where the atmosphere temperature sensor 22 and the transducer 40 are apart from each other, so that there can be a slight difference in temperature between the air temperature Ta of the position of the atmosphere temperature sensor 22 and the air temperature Tr of the position of the transducer 40. In such cases as well, therefore, in consideration of the space between the atmosphere temperature sensor 22 and the transducer 40, the thermal equivalent circuit shown in FIG. 10(A) is modified to a circuit shown in FIG. 10(B), while the calculation block diagram shown in FIG. 11(A) is modified to the calculation block diagram shown in FIG. 11(B). Since the above-described modification is similar to the case of the thermal equivalent circuit of FIG. 5(B) and the calculation block diagram of FIG. 6(B) of the modification of the first embodiment, components of the above-described modification are given the same numerical references as those of the modification of the first embodiment to omit explanation about the components.

The microcomputer 30 calculates the coil temperature Tc2 in accordance with the calculation block shown in FIG. 11(B) according to the above-described modification. In this modification as well, therefore, even though the atmosphere temperature sensor 22 and the transducer 40 are apart from each other to result in a difference between the air temperature Ta of the position of the atmosphere temperature sensor 22 and the air temperature Tr of the position of the transducer 40, the coil temperature Tc2 can be accurately figured out because of the consideration of the difference in air temperatures being given to calculation of the coil temperature Tc2.

d. Third Modification

Figure 12:
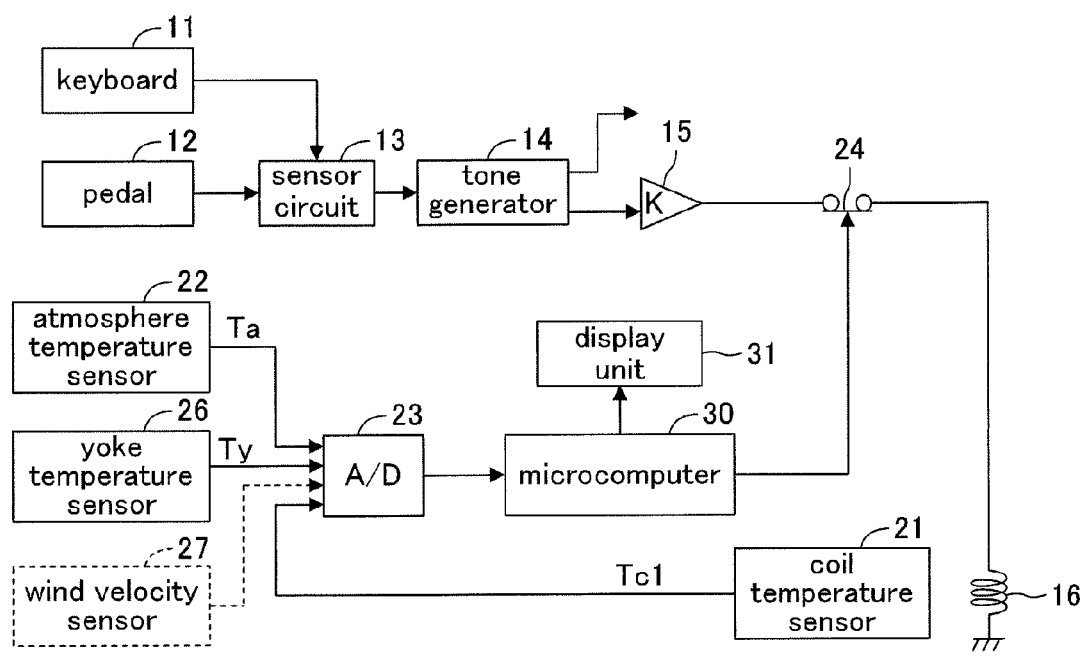
FIG. 12 is a schematic block diagram indicating an electronic circuit embedded in a piano in order to vibrate a sound board according to the third modification of the first embodiment.

Next, the third modification of the first embodiment will be explained. In the third modification, the calculation of the coil temperature Tc2 which is the second measured temperature is further modified from that of the first embodiment. The electronic circuit of the piano according to the third modification is configured as indicated in FIG. 12 such that the connecting line for supplying the voltage V which is to be applied to the coil 16 to the A/D converting circuit 23 is removed from the first embodiment shown in FIG. 1, with a yoke temperature sensor 26 being provided instead. The yoke temperature sensor 26 is formed of a thermal diode temperature sensor, a thermistor temperature sensor or the like to be provided for the yoke 44 as indicated by broken lines in FIG. 2 to sense a temperature Ty of the yoke 44 (that is, the yoke temperature Ty) to supply a detection signal indicative of the yoke temperature Ty to the A/D converting circuit 23. The A/D converting circuit 23 converts the detection signal indicative of the yoke temperature Ty from analog to digital, instead of the voltage V applied to the coil 16 of the case of the first embodiment, and supplies the converted signal to the microcomputer 30. The other portions of this electronic circuit are configured similarly to the case of the first embodiment. In addition, the transducer 40 of the piano according to the third modification is also configured similarly to the transducer of the first embodiment shown in FIG. 2. As for the third modification as well, therefore, only the points which are different from the first embodiment will be explained, with the similar portions being given the same numerical references as the first embodiment to omit explanations about the similar portions.

Figure 13:
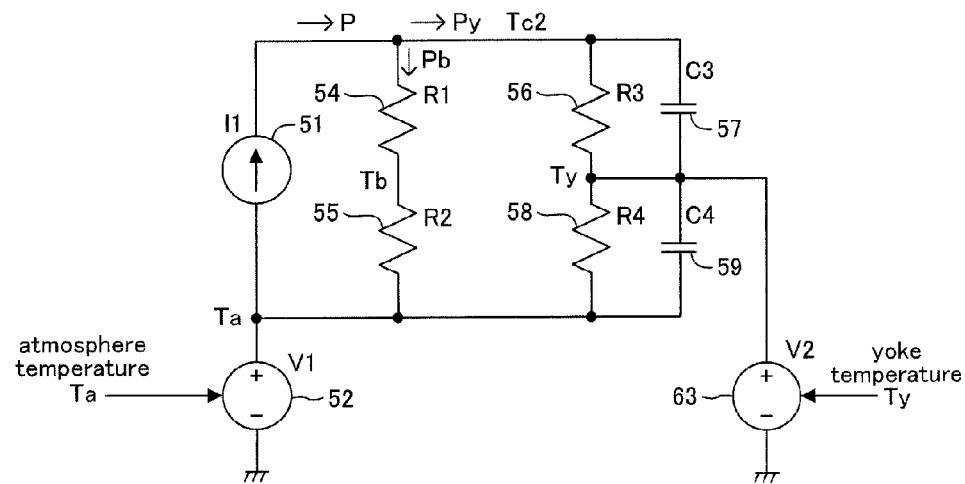
FIG. 13(A) is a diagram indicating a thermal equivalent circuit of a transducer for calculating temperature of the coil shown in FIG. 12 according to the third modification of the first embodiment.
FIG. 13(B) is a diagram indicating a thermal equivalent circuit of a transducer according to a modification of FIG. 13(A)
Figure 13:
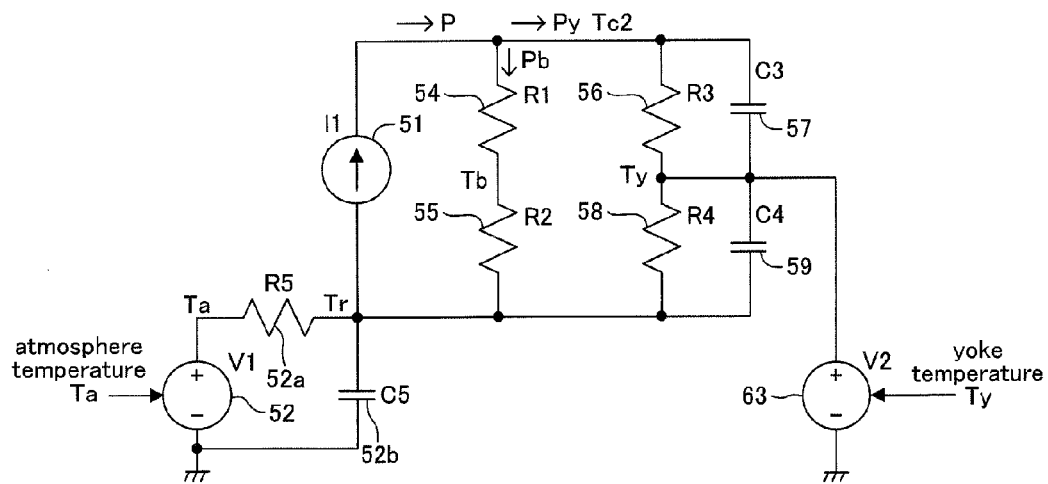

In the thermal equivalent circuit of the transducer 40 for calculating the coil temperature Tc2 in the third modification, the input path of the voltage V applied to the coil 16, the feedback path of the coil temperature Tc2 and the calculating unit 53 of the first embodiment are omitted as indicated in FIG. 13(A). In this modification, furthermore, although the current source 51, the coil-bobbin thermal resistance 54 and the bobbin thermal dissipation resistance 55 are not necessary for the calculation of the coil temperature Tc2, these components exist as constituting units of the transducer 40. In FIG. 13(A), therefore, these components 51, 54 and 55 are included. In the thermal equivalent circuit according to the third modification, furthermore, a voltage source 63 is provided between a point where the magnetic fluid thermal resistance 56 is connected with the yoke heat dissipation resistance 58 and the ground. The voltage source 63 corresponds to the yoke temperature Ty, so that the voltage source 63 outputs a voltage V2 corresponding to the yoke temperature Ty sensed by the yoke temperature sensor 26. The other portions of the third modification are configured similarly to the first embodiment.

Figure 14:
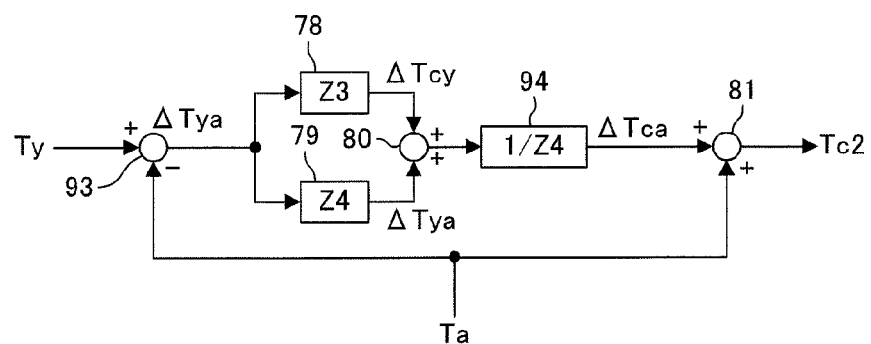
FIG. 14(A) is a block diagram for calculation of coil temperature by the microcomputer on the basis of the thermal equivalent circuit of FIG. 13(A)
FIG. 14(B) is a block diagram for calculation of coil temperature by the microcomputer on the basis of the thermal equivalent circuit of FIG. 13(B)
Figure 14:
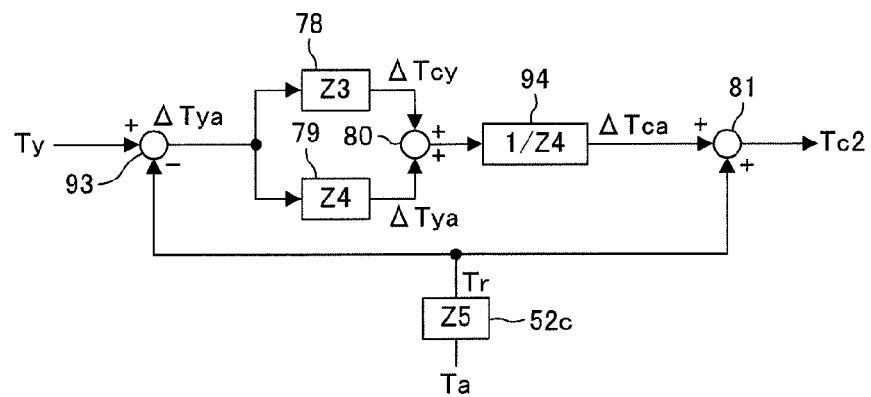

The calculation block for calculating the coil temperature Tc2 on the basis of this thermal equivalent circuit is indicated in FIG. 14(A). In this case, the voltage of the point where the magnetic fluid thermal resistance 56 is connected with the yoke heat dissipation resistance 58 corresponds to the yoke temperature Ty, while the voltage on the both ends of the yoke heat dissipation resistance 58 corresponds to a difference Ty−Ta (the amount of rise in yoke temperature ΔTya) between the yoke temperature Ty and the atmosphere temperature Ta. For the calculation for figuring out this difference, a subtracting portion 93 is provided in the calculation block. A current corresponding to the difference Ty−Ta is fed through a parallel circuit in which the magnetic fluid thermal resistance 56 and the magnetic fluid thermal capacitance (magnetic fluid heat capacitance) 57 are connected in parallel to determine the voltage on the both ends of the magnetic fluid thermal resistance 56 (the amount of rise in magnetic fluid temperature ΔTcy) in accordance with this current to add the amount of rise in yoke temperature ΔTya (difference in temperature Ty−Ta) and the amount of rise in magnetic fluid temperature ΔTcy to the atmosphere temperature Ta to figure out the coil temperature Tc2. The calculation of these temperatures is realized by the subtracting portion 93, the calculation portions 78, 79 and 94, and the adding portions 80 and 81. More specifically, the amount of rise in magnetic fluid temperature ΔTcy is calculated by the calculating processing by the subtracting portion 93 and the calculation portions 78 and 94, the amount of rise in yoke temperature ΔTya is calculated by the calculating processing by the subtracting portion 93 and the calculation portions 79 and 94, and the amount of rise in magnetic fluid temperature ΔTcy and the amount of rise in yoke temperature ΔTya are added by the adding processing by the adding portion 80. By the calculating processing by the adding portion 81, furthermore, an added value ΔTca obtained by adding the amount of rise in magnetic fluid temperature ΔTcy and the amount of rise in yoke temperature ΔTya is added to the atmosphere temperature Ta. Furthermore, the calculations done by the calculation portions 78 and 79, and the adding portions 80 and 81 are similar to those of the first embodiment. Furthermore, the calculation portion 94 converts a value obtained by calculating processing which is similar to the calculation portion 79 to a reciprocal.

The operation of the third modification configured as above will be explained. In the third modification as well, the microcomputer 30 executes the program indicated in FIG. 3A to FIG. 3C. In the program, at step S13 of the first embodiment, the yoke temperature Ty sensed by the yoke temperature sensor 26 is received instead of the application voltage V, while the coil temperature Tc2 is calculated at step S14 by a method which is different from that of the first embodiment. In the third modification, the coil temperature Tc2 is calculated by use of the atmosphere temperature Ta and the yoke temperature Ty in accordance with the calculation block shown in FIG. 14(A). Since the other steps of FIGS. 3A to 3C are done similarly to the first embodiment, the explanations about the other steps are omitted.

In the third modification, the microcomputer 30 receives the atmosphere temperature Ta sensed by the atmosphere temperature sensor 22 and the yoke temperature Ty sensed by the yoke temperature sensor 26, and calculates the coil temperature Tc2 (the second measured temperature) by use of the received atmosphere temperature Ta and the yoke temperature Ty. According to the third modification, therefore, although the yoke temperature sensor 26 for sensing the yoke temperature Ty is necessary, the calculating processing is simplified, compared with the first embodiment and its first and second modifications. According to the third modification, as a result, the calculation of the coil temperature Tc2 is simplified.

In the third modification as well, on the precondition that the atmosphere temperature sensor 22 is placed near the transducer 40, the coil temperature Tc2 is calculated, considering that the air temperature sensed by the atmosphere temperature sensor 22 is defined as the atmosphere temperature Ta of the transducer 40. In this modification as well, however, there can be cases where the atmosphere temperature sensor 22 and the transducer 40 are apart from each other, so that there can be a slight difference in temperature between the air temperature Ta of the position of the atmosphere temperature sensor 22 and the air temperature Tr of the position of the transducer 40. In this case as well, therefore, in consideration of the space between the atmosphere temperature sensor 22 and the transducer 40, the thermal equivalent circuit shown in FIG. 13(A) is modified to a circuit shown in FIG. 13(B), while the calculation block diagram shown in FIG. 14(A) may be modified to the calculation block diagram shown in FIG. 14(B). Since the above-described modification is similar to the case of the thermal equivalent circuit of FIG. 5(B) and the calculation block diagram of FIG. 6(B) of the modification of the first embodiment, components of the above-described modification are given the same numerical references as those of the modification of the first embodiment to omit explanation about the components.

The microcomputer 30 calculates the coil temperature Tc2 in accordance with the calculation block shown in FIG. 14(B) according to the above-described modification. In this modification as well, therefore, even though the atmosphere temperature sensor 22 and the transducer 40 are apart from each other to result in a difference between the air temperature Ta of the position of the atmosphere temperature sensor 22 and the air temperature Tr of the position of the transducer 40, the coil temperature Tc2 can be accurately figured out because of the consideration of the difference in air temperatures being given to calculation of the coil temperature Tc2.

a4. Fourth Modification

Next, the fourth modification of the first embodiment will be explained, the fourth modification being related to a position where the voltage V applied to the coil 16 is to be retrieved. In the first embodiment, and its first and second modifications, the terminal voltage of the coil 16 is supplied to the microcomputer 30 via the A/D converting circuit as the voltage V applied to the coil 16. Instead of this configuration, however, an output voltage of the amplifier circuit 15 on an input side of the relay circuit 24 may be supplied to the microcomputer 30 via the A/D converting circuit 23. Furthermore, on the precondition that the amplification factor K of the amplifier circuit 15 is constant, the input voltage of the amplifier circuit 15 may be supplied to the microcomputer 30 via the A/D converting circuit 23 to multiply the input voltage by the factor of K by the microcomputer 30 to use the multiplied voltage as the voltage V applied to the coil 16.

a5. Fifth Modification

Next, the fifth modification of the first embodiment will be explained, the fifth modification calculating the coil temperature Tc2 in consideration of wind velocity. For the measurement of the coil temperature Tc2 (the second measured temperature) in the first embodiment and its various modifications, consideration may be given to wind velocity at a location where the transducer 40 is placed. As the wind velocity in the atmosphere where the transducer 40 is placed increases, the resistance value R2 of the bobbin thermal dissipation resistance 55 and the resistance value R4 of the yoke thermal dissipation resistance 58 decrease. Therefore, it is preferable to correct such that as the wind velocity in the atmosphere where the transducer 40 is placed increases, the resistance values R2 and R4 decrease. For the correction calculation, a conversion table which is provided on the basis of measured results by experiments and indicates the resistance values R2 and R4 which vary with wind velocity, a conversion function and the like may be used.

In FIGS. 1, 9 and 12, more specifically, a wind velocity sensor 27 which is placed near the transducer 40 to sense wind velocity in the atmosphere of the transducer 40 to output a detection signal indicative of the sensed wind velocity is connected to the A/D converting circuit 23 as indicated by broken lines. The A/D converting circuit 23 converts the detection signal indicative of the wind velocity as well from analog to digital, and supplies the converted signal to the microcomputer 30. In addition to the steps S11 to S13 of the program shown in FIG. 3A to FIG. 3C according to the first embodiment and its modifications, the microcomputer 30 also receives the wind velocity sensed by the wind velocity sensor 27. At step S14, furthermore, the microcomputer 30 corrects the resistance values R2 and R4 in the thermal equivalent circuits of FIGS. 5, 7, 10 and 13, and the calculation blocks of FIGS. 6, 8, 11 and 14 such that as the sensed wind velocity increases, the resistance values R2 and R4 decrease, and calculates the coil temperature Tc2.

In the judgment process of step S31 of FIG. 3B of the first embodiment and its modifications, however, in consideration of the use of piano outdoors, that is, in consideration of a possibility that the coil temperature Tc1 is lower than the coil temperature Tc2, it is judged whether the coil temperature Tc1 is lower than the temperature value Tc2−20. In the fifth modification, however, the coil temperature Tc2 is calculated in consideration of wind velocity. In the fifth modification, therefore, in consideration of an error of 10 degrees Celsius which is smaller than the error of 20 degrees Celsius, it is judged at step S31 whether the coil temperature Tc1 is smaller than a temperature value (Tc2−10). The error of 10 degrees Celsius may be a different value.

a6. Sixth Modification

Next, the sixth modification of the first embodiment will be explained, the sixth modification being related to the relay circuit 24 which restricts supply of audio signals to the coil 16. In the first embodiment and its modifications, the relay circuit 24, that is, a relay switch serving as protection means (restriction means, level controller) which turns on and off the supply of audio signals to the coil 16 is provided to be situated after the amplifier circuit 15 in order to prevent excessive rise in temperature of the coil 16. However, the relay circuit 24 serving as the protection means may be replaced with an electronic switch circuit formed of a transistor or the like so that the microcomputer 30 can control the switching of the electronic switch circuit between on and off. Since the relay circuit 24 or the electronic switch circuit serving as protection means is a circuit for allowing or suspending the supply of audio signals to the coil 16, the relay circuit 24 or the electronic switch circuit may be provided anywhere as long as the circuit is provided on a path of audio signals to the coil 16. For example, the relay circuit 24 or the electronic switch circuit may be provided between the tone generator 14 and the amplifier circuit 15.

Figure 15:
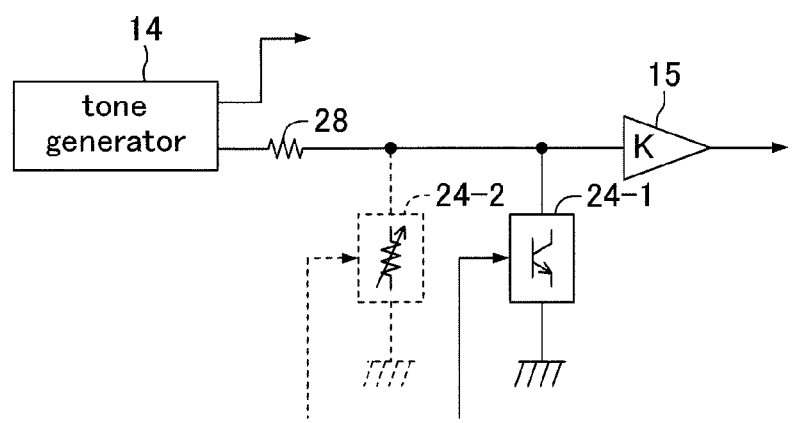
FIG. 15 is a schematic block diagram indicating a modified part of an electronic circuit according to the sixth modification of the first embodiment.

In the first embodiment and its modifications, furthermore, the relay circuit 24 or the electronic switch circuit may be replaced with an electronic switch circuit 24-1 which is provided between the line connecting the tone generator 14 and the amplifier circuit 15, and the ground, and is in an off-state in normal times as indicated in FIG. 15 so that the electronic switch circuit 24-1 can be controlled to switch between on and off by the steps S33, S38 and S41 of FIG. 3B and FIG. 3C. In this case, if "Yes" is determined at step S15, S17, S19, S21, S23, S25, S27, S29, S31 or S37, the microcomputer 30 turns on the electronic switch circuit 24-1 at step S33 or S38 to stop the supply of audio signals to the coil 16. If "Yes" is determined at step S40 in the state where the supply of audio signals to the coil 16 is stopped, the microcomputer 30 turns off the electronic switch circuit 24-1 to resume the supply of audio signals to the coil 16 at step S41. In the sixth modification, furthermore, a resistance 28 is provided between the tone generator 14 and a terminal of the electronic switch circuit 24-1, the terminal being situated on the tone generator side. The configuration and the operation other than the above of the sixth modification are similar to the first embodiment and its modifications. According to the sixth modification as well, the supply of audio signals to the coil 16 and the suspension of the supply of audio signals are controlled by the electronic switch circuit 24-1 to prevent excessive rise in temperature of the coil 16.

Furthermore, the electronic switch circuit 24-1 may be replaced with a relay circuit which is similar to the relay circuit (relay switch) 24 used in the first embodiment and its modifications so that the microcomputer 30 can control to switch the relay circuit between on and off as in the case of the electronic switch circuit 24-1. Furthermore, the electronic switch circuit 24-1 or the relay circuit may be provided between the line connecting the amplifier circuit 15 and the coil 16, and the ground.

Instead of the electronic switch circuit 24-1 or the relay circuit, furthermore, an electronic volume may be used. In this case, an electronic volume 24-2 may be provided between the line connecting the tone generator 14 and the amplifier circuit 15, and the ground as indicated by broken lines in FIG. 15. In this case as well, the resistance 28 is provided between the tone generator 14 and a terminal of the electronic volume 24-2, the terminal being situated on the tone generator side. The electronic volume 24-2 is controlled by the microcomputer 30 to be kept at the maximum volume in normal times. If the coil temperature Tc1 is equal to or higher than 120 degrees Celsius, the microcomputer 30 determines "Yes" at step S37, and reduces the value of the electronic volume 24-2 to reduce the amount of audio signals supplied to the coil 16 at step S38. On the other hand, if the coil temperature Tc1 is lower than 100 degrees Celsius in a state where the amount of audio signals supplied to the coil 16 has been reduced, the microcomputer 30 determines "Yes" at step S40, and increases the value of the electronic volume 24-2 to the maximum value to increase the amount of audio signals supplied to the coil 16 at step S41. In this case, if the atmosphere temperature Ta, or the coil temperature Tc1 or Tc2 exhibits an abnormal value due to a malfunction in the measurement means to determine "Yes" at step S15, S17, S19, S21, S23, S25, S27, S29 or S31, the microcomputer 30 turns the output level of the electronic volume 24-2 to zero by the step S33 to suspend the supply of audio signals to the coil 16. In this case as well, the electronic volume 24-2 may be controlled not to turn the volume value to zero but to reduce the volume value of the electronic volume 24-2, similarly to the step S38. The configuration and the operation other than the above are similar to the first embodiment and its modifications. As a result, the amount of supply of audio signals to the coil 16 can be controlled by the electronic volume 24-2. In this case as well, the electronic volume 24-2 may be provided between the line connecting the amplifier circuit 15 and the coil 16, and the ground.

a7. Seventh Modification

Next, the seventh modification of the first embodiment will be explained, the seventh modification being configured to control the supply of audio signals to the coil 16 by the coil temperature Tc2. In the seventh modification, the microcomputer 30 determines at step S37 of FIG. 3C whether the coil temperature Tc2 is equal to or higher than 120 degrees Celsius, instead of examining the coil temperature Tc1. If the coil temperature Tc2 is equal to or higher than 120 degrees Celsius, the microcomputer 30 turns off the relay circuit 24 at step S38 to suspend the supply of audio signals to the coil 16. After the suspension of supply of audio signals to the coil 16 (that is, in the cooling-down state), the microcomputer 30 determines at step S40 whether the coil temperature Tc2 is lower than 100 degrees Celsius, instead of examining the coil temperature Tc1. If the coil temperature Tc2 is lower than 100 degrees Celsius, the microcomputer 30 turns on the relay circuit 24 at step S41 to resume the supply of audio signals to the coil 16.

As explained in the sixth modification, in the case where the electronic volume 24-2 is used as the restriction means or the level controller for restricting supply of audio signals to the coil 16 (see FIG. 15), that is, in the case where the level of supply of audio signals to the coil 16 is decreased by the electronic volume 24-2 in order to cope with excessive rise in temperature of the coil 16, the microcomputer 30 turns the volume value of the electronic volume 24-2 to "0" or reduces the volume value of the electronic volume 24-2 at step S38, instead of turning off the relay circuit 24. At step S41, furthermore, the microcomputer 30 turns the electronic volume 24-2 to return to the maximum volume. According to the seventh modification as well, as a result, the supply of audio signals to the coil 16 can be automatically resumed when the coil temperature Tc2 has been decreased.

a8. Eighth Modification

Next, the eighth modification of the first embodiment will be explained, the eighth modification being related to a modification of the transducer 40. Although the magnetic fluid 47 is provided in the transducer 40 in the first embodiment and its modifications, the temperature measurement of the coil 16 on the basis of thermal equivalent circuit can be also applied to a transducer without the magnetic fluid 47. In this case, in the thermal equivalent circuits shown in FIGS. 5, 7, 10 and 13, the magnetic fluid thermal resistance 56 and the magnetic fluid thermal capacitance (magnetic fluid thermal capacitor) 57 are replaced with an air thermal resistance and an air thermal capacitance. Furthermore, the resistance value of the air thermal resistance is extremely greater than that of the magnetic fluid thermal resistance 56. Therefore, the resistance value R3 of the thermal equivalent circuits shown in FIGS. 5, 7, 10 and 13 is extremely great in the cases of the first embodiment and its modifications. As a result, most of the consumption power P (generated heat) of the coil 16 is dissipated by the bobbin 45. In such a case, the coil temperature Tc2 is higher than that of the cases of the first embodiment and its modifications.

Figure 16:
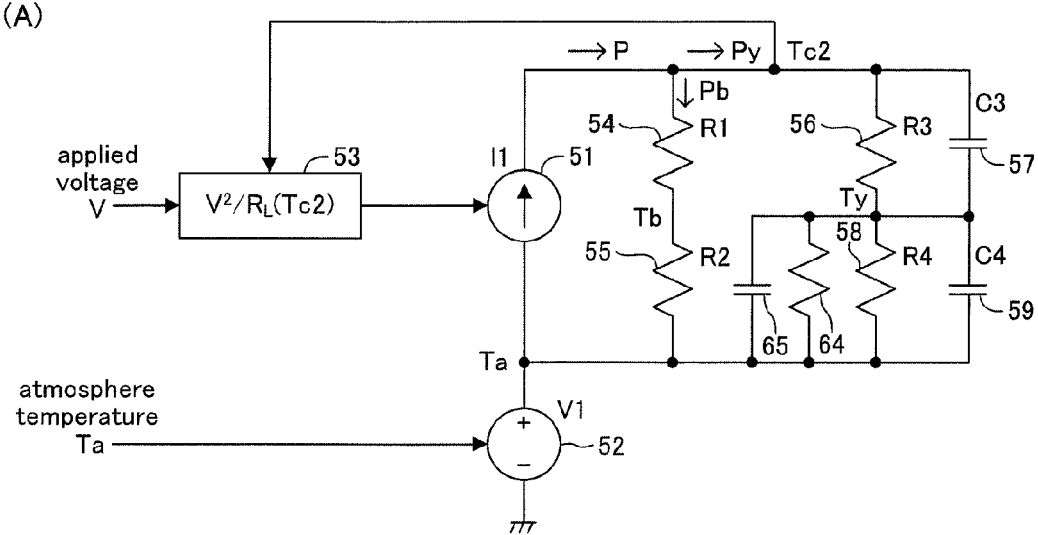
FIG. 16(A) is a diagram indicating a thermal equivalent circuit of a transducer of a case where a yoke is provided with a thermal dissipation plate according to the eighth modification of the first embodiment.
FIG. 16(B) is a diagram indicating a thermal equivalent circuit of a transducer according to a modification of FIG. 16(A)
Figure 16:
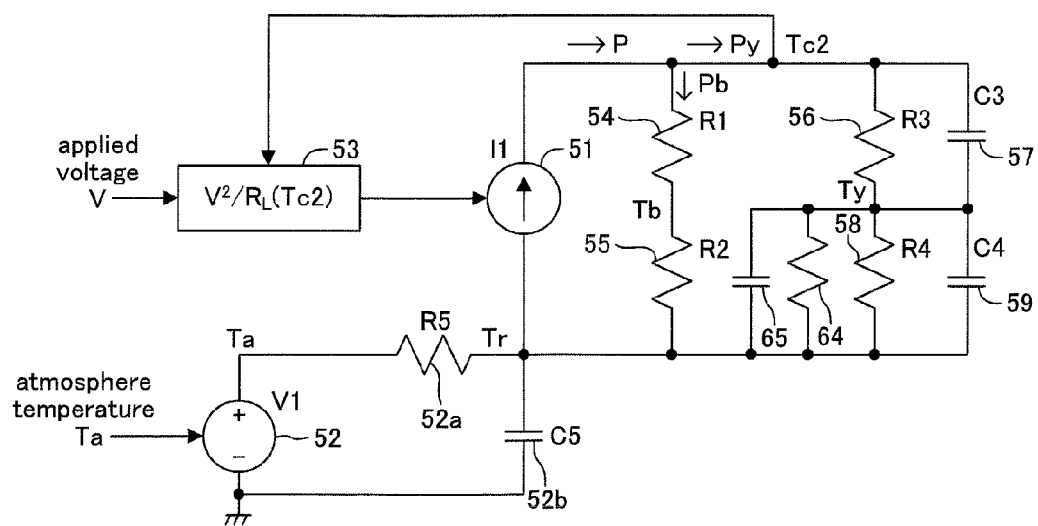

Furthermore, the temperature measurement of the coil 16 on the basis of thermal equivalent circuit can be also applied to a transducer in which the yoke 44 is provided with a thermal dissipation plate in the first embodiment and its modifications. In this case, the thermal equivalent circuit of FIG. 5(A) is modified such that a thermal dissipation plate thermal resistance 64 and a thermal dissipation plate thermal capacitance (thermal dissipation plate thermal capacitor) 65 are connected in parallel with the yoke thermal dissipation resistance 58 and the yoke thermal capacitance (yoke thermal capacitor) 59 as indicated in FIG. 16(A). The thermal equivalent circuits shown in FIG. 7(A), FIG. 10(A) and FIG. 13(A) are modified similarly. In this case, therefore, the resistance value R4 of the yoke thermal dissipation resistance 58 of FIG. 5(A), FIG. 7(A), FIG. 10(A) and FIG. 13(A) is substantially reduced, so that the temperature Tc of the coil 16 is lower than that of the cases of the first embodiment and its modifications.

Figure 17:
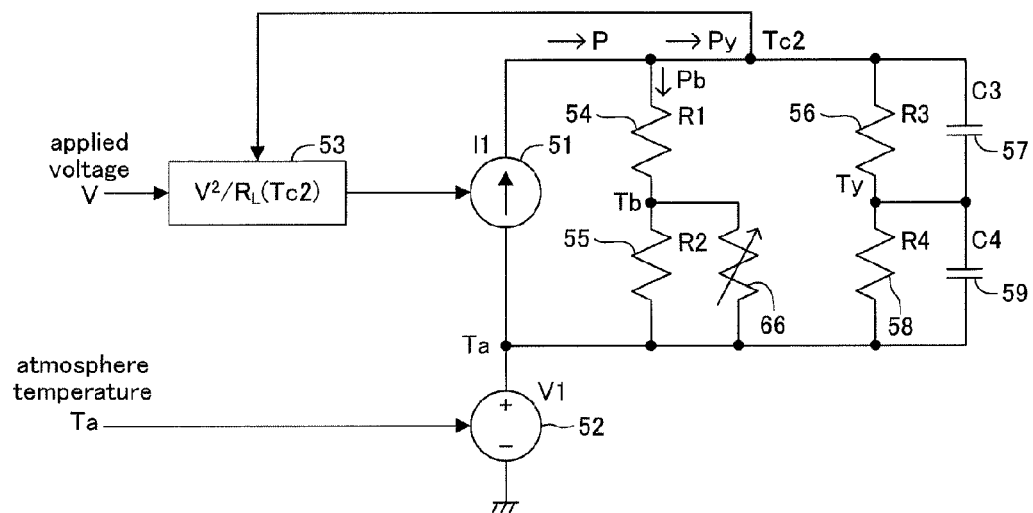
FIG. 17(A) is a diagram indicating a thermal equivalent circuit of a transducer of a case where a heat dissipation fan is provided near a bobbin according to the eighth modification of the first embodiment.
FIG. 17(B) is a diagram indicating a thermal equivalent circuit of a transducer according to a modification of FIG. 17(A)
Figure 17:
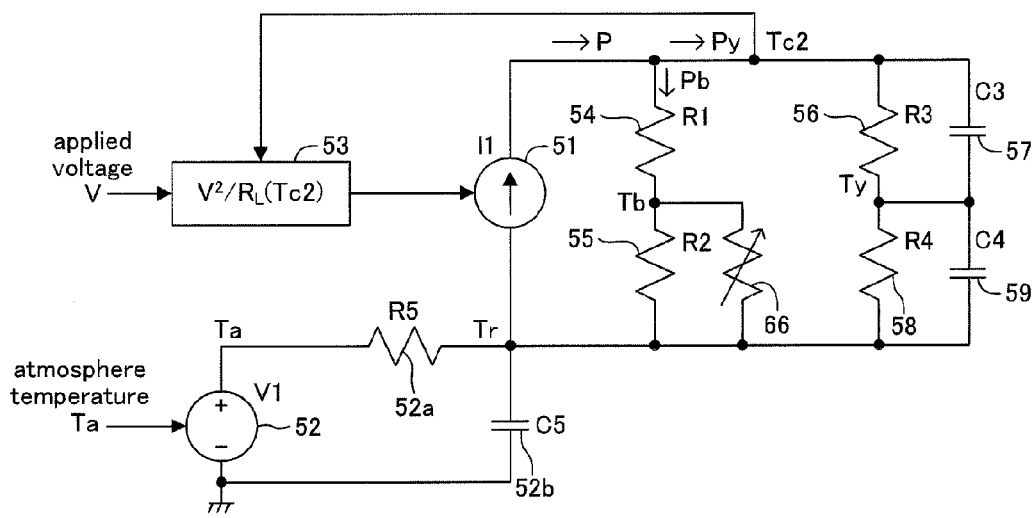

In the first embodiment, furthermore, the temperature measurement of the coil 16 on the basis of thermal equivalent circuit can be also applied to a transducer having a thermal dissipation fan provided near the bobbin 45. In this case, the thermal equivalent circuit shown in FIG. 5(A) is modified such that a thermal dissipation fan resistance 66 is connected in parallel with the bobbin thermal dissipation resistance 55 as indicated in FIG. 17(A). The thermal equivalent circuits shown in FIG. 7(A), FIG. 10(A) and FIG.

13(A) are modified similarly. As a result, the resistance value R2 of the bobbin thermal dissipation resistance 55 shown in FIG. 5(A), FIG. 7(A), FIG. 10(A) and FIG. 13(A) is substantially reduced, so that the temperature Tc of the coil 16 is lowered, compared with the cases of the first embodiment and its modifications. By providing the thermal dissipation fan, furthermore, the resistance value R4 of the yoke thermal dissipation resistance 58 is also reduced.

Figure 18:
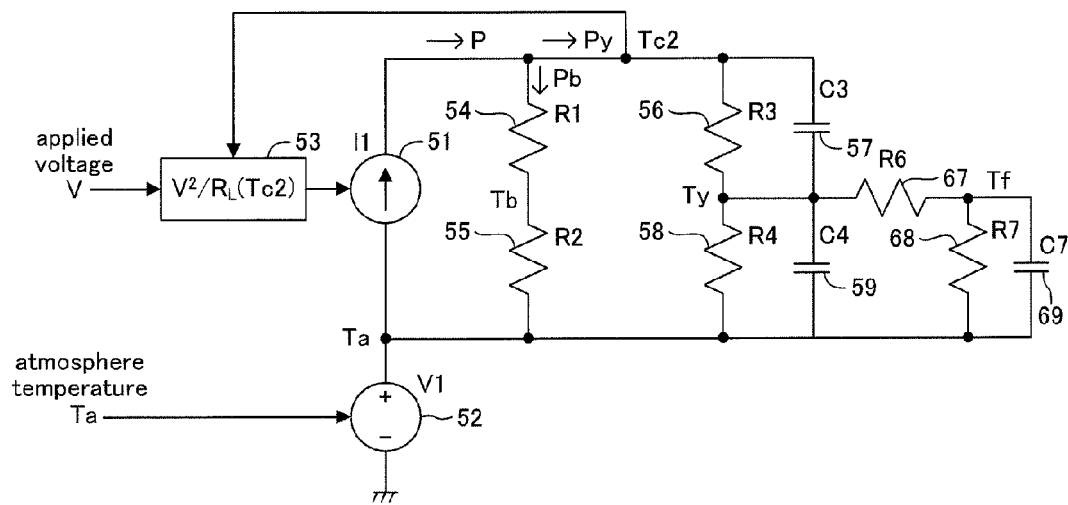
FIG. 18(A) is a diagram indicating a thermal equivalent circuit of a transducer of a case where a yoke is provided with a heat pipe according to the eighth modification of the first embodiment.
FIG. 18(B) is a diagram indicating a thermal equivalent circuit of a transducer according to a modification of FIG. 18(A)
Figure 18:
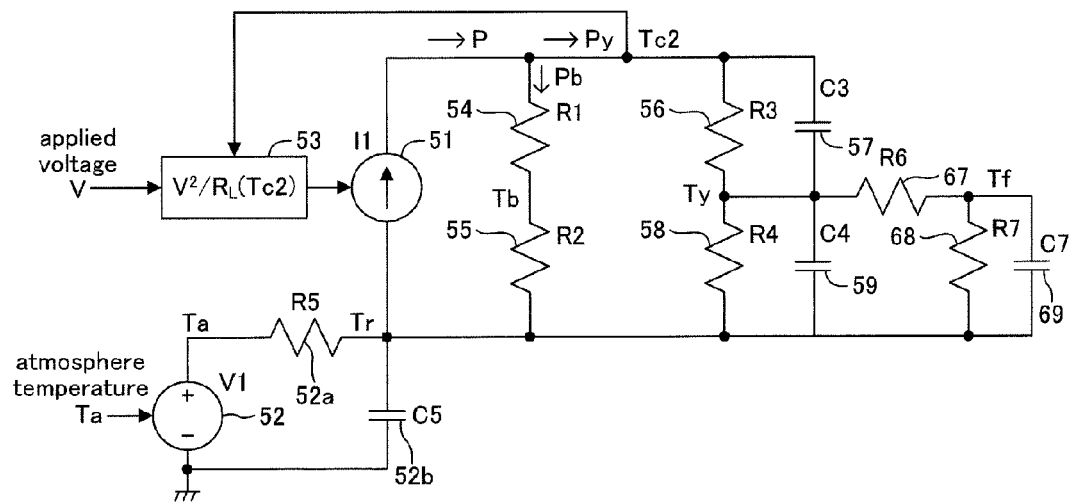

In the first embodiment and its modifications, furthermore, the temperature measurement of the coil 16 on the basis of thermal equivalent circuit can be also applied to a transducer having a heat pipe on the yoke 44 so that the heat on the yoke 44 can escape into a frame of the piano. In this case, the thermal equivalent circuit shown in FIG. 5(A) is modified such that a heat pipe dissipation resistance 67 and a frame thermal dissipation resistance 68 are connected in parallel with the yoke thermal dissipation resistance 58 and the yoke thermal capacitance (yoke thermal capacitor) 59, with a frame thermal capacitance (frame thermal capacitor) 69 being connected in parallel with the frame thermal dissipation resistance 68 as indicated in FIG. 18(A). In FIG. 18(A), a resistance value of the heat pipe dissipation resistance 67 is represented as R6, a resistance value of the frame thermal dissipation resistance 68 is represented as R7, and the amount of capacitance of the frame thermal capacitance 69 is represented as C7. The thermal equivalent circuits shown in FIG. 7(A), FIG. 10(A) and FIG. 13(A) are modified similarly. As a result, the resistance value R4 of the yoke thermal dissipation resistance 58 shown in FIG. 5(A), FIG. 7(A), FIG. 10(A) and FIG. 13(A) is substantially reduced, so that the temperature Tc of the coil 16 is lowered, compared with the cases of the first embodiment and its modifications.

In the thermal equivalent circuits as well shown in FIG. 16(A), FIG. 17(A), and FIG. 18(A) according to the above-described modifications, on the precondition that the atmosphere temperature sensor 22 is placed near the transducer 40, the coil temperature Tc is calculated, considering that the indoor temperature Ta sensed by the atmosphere temperature sensor 22 is defined as the atmosphere temperature Ta of the transducer 40. In these cases as well, however, there can be cases where the atmosphere temperature sensor 22 and the transducer 40 are apart from each other, so that there can be a slight difference in temperature between the air temperature Ta of the position of the atmosphere temperature sensor 22 and the air temperature Tr of the position of the transducer 40. In these cases as well, therefore, in consideration of the space between the atmosphere temperature sensor 22 and the transducer 40, the thermal equivalent circuits shown in FIG. 16(A), FIG. 17(A), and FIG. 18(A) are modified to circuits shown in FIG. 16(B), FIG. 17(B), and FIG. 18(B), respectively. Since the above-described modifications are similar to the case of the thermal equivalent circuit of FIG. 5(B) of the modification of the first embodiment, components of the above-described modifications are given the same numerical references as those of the modification of the first embodiment to omit explanation about the components.

The microcomputer 30 calculates the coil temperature Tc in accordance with the calculation block according to the above-described modifications. In these modifications as well, therefore, even though the atmosphere temperature sensor 22 and the transducer 40 are apart from each other to result in a difference between the air temperature Ta of the position of the atmosphere temperature sensor 22 and the air temperature Tr of the position of the transducer 40, the temperature Tc of the coil 16 can be accurately figured out because of the consideration of the difference in air temperatures being given to calculation of the coil temperature Tc.

b. Second Embodiment

Figure 19:
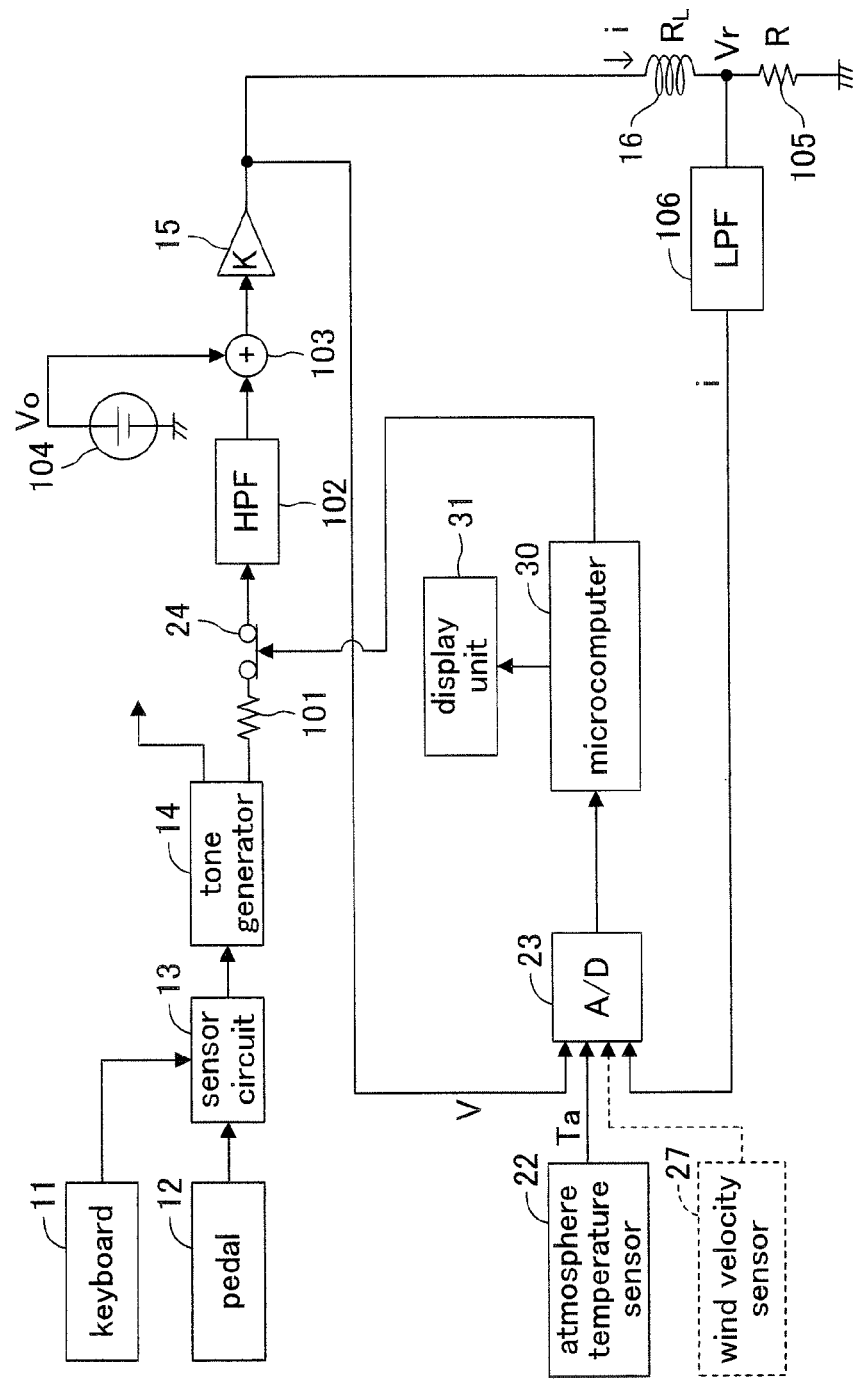
FIG. 19 is a schematic block diagram indicating an electronic circuit embedded in a piano in order to vibrate a sound board according to the second embodiment of the present invention.

Next, a piano according to the second embodiment of the present invention will be explained. The second embodiment is configured such that a resistance value $R_L$ of the coil 16 is sensed to figure out the coil temperature Tc1 on the basis of the relation between the resistance value $R_L$ and the temperature of the coil 16, instead of the measurement of the coil temperature Tc1 (the first measured temperature) by the coil temperature sensor 21 in the first embodiment. A schematic block diagram of an electronic circuit for vibrating a sound board embedded in the piano according to the second embodiment is shown in FIG. 19. For the second embodiment, components which are the same as those of the first embodiment are given the same numerical references as those of the first embodiment to omit explanation about the components.

In the second embodiment, a resistance 101, the relay circuit 24 (the same as the first embodiment), a high-pass filter circuit 102 and an adding circuit 103 are connected in series between the tone generator 14 and the amplifier circuit 15, while a constant voltage source circuit 104 is connected to the adding circuit 103. The amplification factor K of the amplifier circuit 15 is a predetermined constant value.

In order to detect the resistance value of the coil 16, the constant voltage source circuit 104 outputs a predetermined magnitude of DC voltage Vo which is to be superimposed on an audio signal. The DC voltage Vo is small enough to have no effect on reproduction of audio signals and to save power consumption. More specifically, it is preferable that the DC voltage Vo falls within a range of voltage values where a current from 10 mA to 100 mA, for example, is fed through the coil 16. Furthermore, it is preferable that the constant voltage source circuit 104 is placed at a position as far as possible from the coil 16 which is a heat source in order to prevent the DC voltage Vo which is to be output from fluctuating due to influence of temperature. The high-pass filter circuit 102 is connected with the output of the tone generator 14 in order to reliably remove DC component from an audio signal output by the tone generator 14 so that the DC voltage passing through the coil 16 depends only on the DC voltage Vo supplied from the constant voltage source circuit 104. The adding circuit 103 adds the DC voltage Vo supplied from the constant voltage source circuit 104 to the audio signal supplied from the tone generator 14 as offset voltage, and outputs the resultant to the amplifier circuit 15.

The coil 16 is grounded via the resistance 105, while a point where the coil 16 is connected with the resistance 105 is connected with the A/D converting circuit 23 via a low-pass filter circuit 106. The resistor 105 is a current sensing resistor (shunt resistor) for sensing the value of a direct current i running through the coil 16. A resistance value R of the resistor 105 is a predetermined value which is small enough to be ignored, compared to the resistance value $R_L$ of the coil 16. The low-pass filter circuit 106 removes alternating current signal component, that is, an audio signal from a voltage signal applied to the resistor 105, and outputs only DC voltage component to the A/D converting circuit 23. To the A/D converting circuit 23, a signal indicative of the voltage V output from the amplifier circuit 15, that is, the voltage V which is to be applied to the coil 16, a detection signal indicative of the atmosphere temperature Ta sensed by the atmosphere temperature sensor 22, and a signal indicative of a voltage (the above-described DC voltage component) output from the low-pass filter circuit 106 are supplied. The A/D converting circuit 23 converts these input signals from analog to digital, and outputs the converted signals to the microcomputer 30. In FIG. 19, the magnitude of the DC voltage component is represented as a voltage value Vr at the coil side of the resistor 105.

Figure 20:
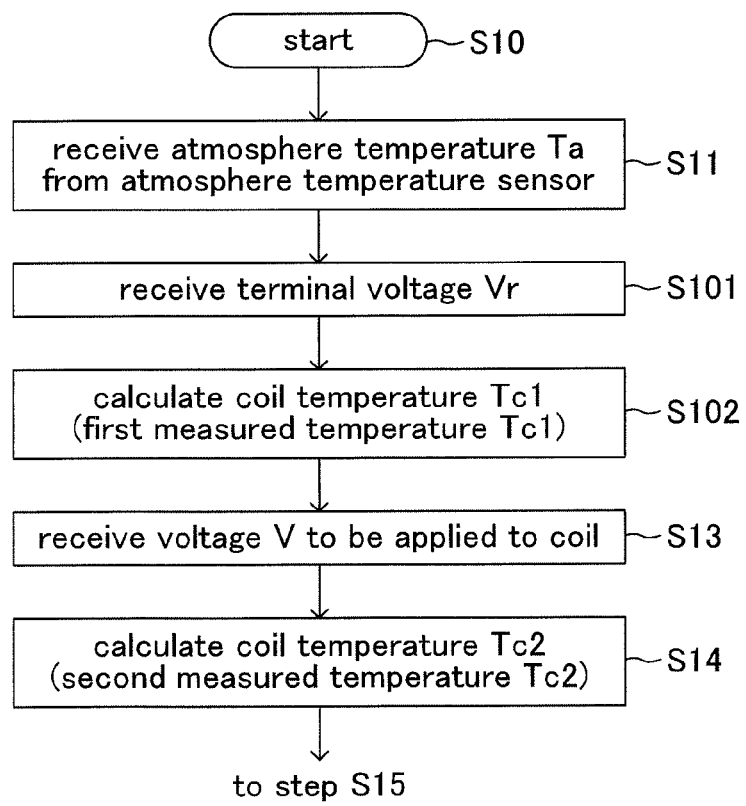
FIG. 20 is a flowchart of a modified part of the flowchart indicated in FIGS. 3A to 3C according to a program executed by the microcomputer of the second embodiment.

The microcomputer 30 executes a program obtained by replacing the step S12 of the program shown in FIG. 3A to FIG. 3C with steps S101 and S102 shown in FIG. 20.

Next, behavior of the piano according to the second embodiment configured as above will be explained. In the second embodiment as well, when a player operates the keyboard 11 and the pedal 12 for musical performance, the tone generator 14 outputs an electric musical tone signal (audio signal) indicative of a piano sound corresponding to the musical performance, as in the case of the first embodiment. The audio signal is supplied to the high-pass filter circuit 102 via the resistance 101 and the relay circuit 24 which is in the on-state under normal conditions, so that the high-pass filter circuit 102 removes a DC component included in the audio signal, and supplies only an alternating component to one input of the adding circuit 103. To the other input of the adding circuit 103, the predetermined DC voltage Vo is supplied from the constant voltage source circuit 104, so that the adding circuit 103 supplies an electric signal obtained by superimposing the DC voltage Vo on the audio signal to the amplifier circuit 15. The amplifier circuit 15 amplifies the supplied signal with the amplification factor K, and supplies the amplified voltage signal to the coil 16 and the resistance 105.

By this voltage signal, a current of the magnitude proportional to the voltage signal is fed through the coil 16 and the resistor 105. By the current passing through the coil 16, the transducer 40 vibrates the bobbin 45, so that the sound board 48 and the bridge 49 also vibrate in response to the vibration of the bobbin 45. In this case, since the DC voltage Vo is designed to be a small amount of voltage that will not affect reproduction of the audio signal, the sound board 48 and the bridge 49 vibrate in response to the audio signal output from the tone generator 14 to pass through the high-pass filter circuit 102. By the second embodiment as well, therefore, the player and audience can hear a musical tone similar to the first embodiment.

In this state, the microcomputer 30 repeatedly executes the program at every predetermined short period of time. In the execution of this program, at step S11 of FIG. 20, the microcomputer 30 receives atmosphere temperature Ta from the atmosphere temperature sensor 22 via the A/D converting circuit 23, similarly to the first embodiment. In the second embodiment, the microcomputer 30 receives the terminal voltage Vr (DC voltage component) of the resistance 105 via the low-pass filter circuit 106 and the A/D converting circuit 23 at step S101, and calculates the coil temperature Tc1 (the first measured temperature) by use of the terminal voltage Vr at step S102.

Before concrete calculation of the coil temperature Tc1, the calculation of the coil temperature Tc1 by use of the terminal voltage Vr will be explained. First, the principle of sensing of the resistance value $R_L$ of the coil 16 will be explained. As described above, the resistance value R of the resistor 105 is so small, compared with the resistance value $R_L$ of the coil 16, so that the resistance value R of the resistor 105 can be ignored. Excluding the audio signal (AC component), if the current value flowing through the coil 16 by the DC voltage Vo is "i", the resistance value $R_L$ of the coil 16 can be expressed as an equation 7 given below, for the DC voltage Vo is amplified with the amplification factor K.

$$R_L = \frac{K \cdot Vo}{i} \quad \text{[Equation 7]}$$

The current value i can be expressed as an equation 8 given below, using the voltage Vr on the both ends of the resistor 105 (voltage from which the AC component has been removed) and the current i. In this sense, the resistor 105 is a current sensing resistor.

$$i = \frac{Vr}{R} \quad \text{[Equation 8]}$$

If the current value i expressed by the equation 8 is substituted into the equation 7, the resistance value $R_L$ of the coil 16 can be expressed as equation 9 given below.

$$R_L = \frac{K \cdot Vo \cdot R}{Vr} \quad \text{[Equation 9]}$$

Next, the calculation of the temperature $T_L$ of the coil 16 by use of the resistance value $R_L$ of the coil 16 will be explained. Assuming that the temperature before energization of the coil 16 is T1 with the resistance value before energization of the coil 16 being R1, the temperature after energization of the coil 16 being T2, and the resistance value after energization of the coil 16 being R2, an equation 10 given below can be obtained.

$$\frac{R2}{R1} = \frac{234.5 + T2}{234.5 + T1} \quad \text{[Equation 10]}$$

If the equation 10 is transformed, the temperature T2 can be expressed by an equation 11 given below.

$$T2 = \frac{R2 \cdot (234.5 + T1)}{R1} - 234.5 \quad \text{[Equation 11]}$$

On the assumption that the temperature T1 before energization of the coil 16 is 25.5 degrees Celsius, the resistance value R1 of the coil 16 at this temperature T1 (=25.5) is measured. Assuming that the resistance value R1 is a value $R_{25.5}$, the equation 11 can be expressed as an equation 12 given below.

$$T2 = \frac{260 \cdot R2}{R_{25.5}} - 234.5 \quad \text{[Equation 12]}$$

Therefore, by substituting the resistance value $R_L$ of the coil 16 expressed by the equation 9 into the resistance value R2 of the equation 12, the temperature $T_L$ of the coil 16 can be figured out as the temperature T2 by the equation 12.

The program processing shown in FIG. 20 will be explained again. In the calculation of the coil temperature Tc1 at step S102, the resistance value $R_L$ of the coil 16 is calculated by use of the input voltage value Vr in accordance with the equation 9. As described above, the amplification factor K, the voltage value Vo and the resistance value R included in the equation 9 are known values. Next, by substituting the calculated resistance value $R_L$ of the coil 16 for the resistance value R2 of the equation 12, the coil temperature Tc1 (equivalent to the temperature T2 of the equation 12) is figured out. As described above, furthermore, the resistance value $R_{25.5}$ of the equation 12 is a known value.

After the above-described step S102, the microcomputer 30 receives the voltage V applied to the coil 16 at step S13, similarly to the first embodiment, and calculates the coil temperature Tc2 (the second measured temperature) by use of the atmosphere temperature Ta and the application voltage V at step S14. The other steps of the program are similar to those of the first embodiment. However, as for the display of causes of the fault of the coil temperature sensor 21 at steps S20 and S22 of FIG. 3A, and steps S28, S30 and S32 of FIG. 3B, a message indicative of a fault of a circuit for generating or sensing the voltage value Vr such as the constant-voltage source circuit 104, the resistance 105 or the low-pass filter circuit 106, or a fault caused by erroneous calculation of the coil temperature Tc1 is displayed.

In the second embodiment which operates as described above, by step S102, the resistance value $R_L$ of the coil 16 is calculated by use of the terminal voltage Vr of the resistance 105 to calculate the coil temperature Tc1 as the first measured temperature by use of the calculated resistance value $R_L$ on the basis of the relation between the resistance value $R_L$ and the temperature of the coil 16. By step S14, furthermore, the coil temperature Tc2 is calculated as the second measured temperature by use of the voltage V applied to the coil 16 and the atmosphere temperature Ta on the basis of the thermal equivalent circuit of the transducer 40. By use of the calculated coil temperatures Tc1 and Tc2, and the atmosphere temperature Ta, similarly to the first embodiment, the control of supply of audio signals to the coil 16, and the judgment and display of various faults are done. Therefore, the second embodiment can also protect the coil 16 and its peripheral devices appropriately, and can allow a user to appropriately cope with the fault.

b1. First Modification

Figure 21:
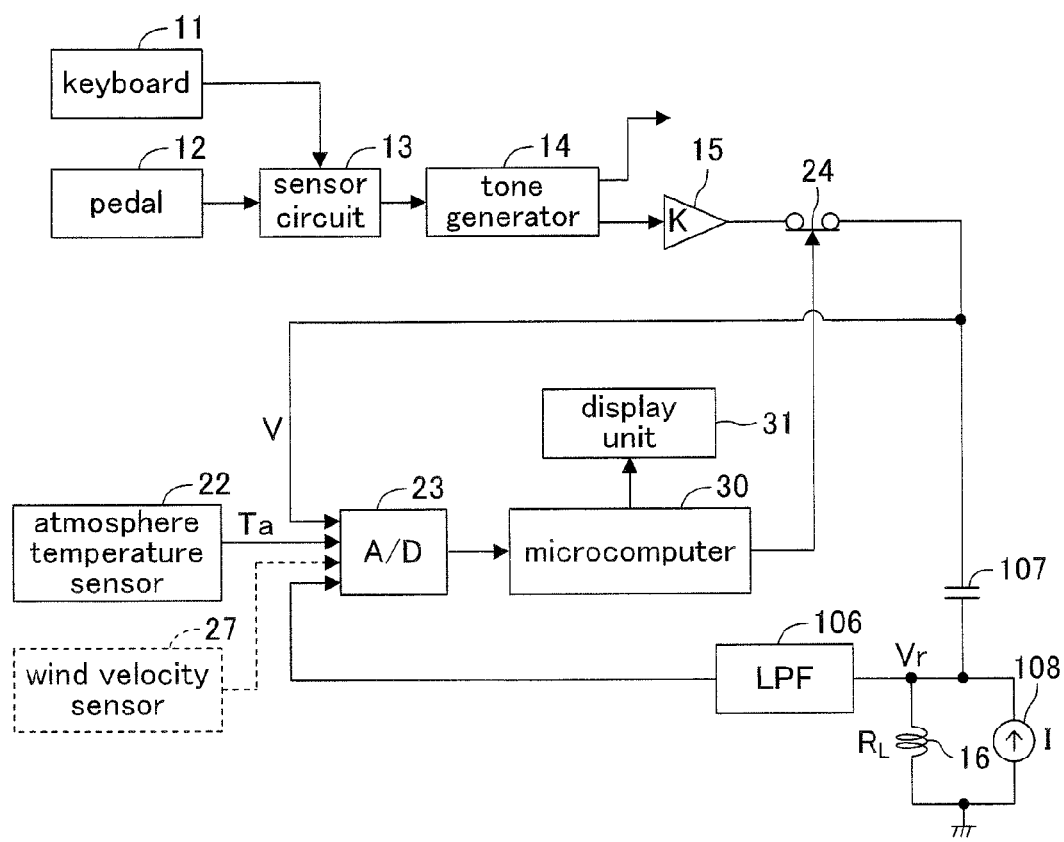
FIG. 21 is a schematic block diagram indicating an electronic circuit embedded in a piano in order to vibrate a sound board according to the first modification of the second embodiment.

Next, the first modification of the second embodiment will be explained. In the first modification, the calculation of the coil temperature Tc1 which is the first measured temperature is modified from that of the second embodiment. FIG. 21 is a schematic block diagram showing an electronic circuit which is embedded in the piano according to the first modification and is provided in order to vibrate the sound board.

In the first modification, the resistance 101, the high-pass filter circuit 102, the adding circuit 103, and the constant-voltage source circuit 104 provided in the second embodiment are omitted, while the amplifier circuit 15 is connected directly to the output side of the tone generator 14, with the relay circuit 24 being connected between the amplifier circuit 15 and the coil 16. Furthermore, an output of the relay circuit 24 is supplied to the A/D converting circuit 23 as the voltage V applied to the coil 16. In this case as well, the amplification factor K of the amplifier circuit 15 is a predetermined constant value.

In the first modification, furthermore, a capacitor 107 and a constant current source circuit 108 are provided in order to sense the resistance value $R_L$ and the temperature Tc1 of the coil 16. The capacitor 107 removes DC component from an audio signal supplied to the coil 16 from the tone generator 14 via the amplifier 15 and the relay circuit 24, and prevents direct current supplied from the constant current source circuit 108 from flowing into the relay circuit 24 side. In other words, the capacitor 107 serves as a high-pass filter circuit which has a function almost the same as the high-pass filter circuit 102 of the second embodiment. The constant current source circuit 108 is connected with the coil 16 in parallel to output a predetermined direct current I which is to be superimposed on an audio signal. The direct current I does not also affect reproduction of the audio signal, and is small enough to save power consumption. More specifically, it is preferable that the direct current I falls within a range from 10 mA to 100 mA. Furthermore, it is preferable that the constant current source circuit 108 is placed at a position as far as possible from the coil 16 which is a heat source in order to prevent the constant current I which is to be output from fluctuating due to influence of temperature.

The microcomputer 30 executes the program similar to the second embodiment, the program being shown in FIGS. 3A to 3C but being obtained by replacing part of FIG. 3A with the steps shown in FIG. 20. However, the calculation of the coil temperature Tc1 (the first measured temperature) of step S102 of FIG. 20 is different from the calculation of the second embodiment. The other steps are configured similarly to the second embodiment, so that components of this modification are provided with the same numerical references as those of the second embodiment to omit explanation about the components.

The behavior of the first modification of the second embodiment configured as above will be explained. In the first modification as well, an audio signal which corresponds to the musical performance played with the keyboard 11 and the pedal 12 and is supplied from the tone generator 14 is fed into the coil 16 via the capacitor 107, so that the sound board 48 is vibrated by the audio signal. In this case, the direct current I output from the constant current source circuit 108 is direct so that the reproduction of the audio signal will not be affected. Furthermore, the direct current I is low in order to save power consumption. Therefore, the direct current I does not affect vibration of the sound board 48, so that favorable musical tone brought about by the vibration of the sound board 48 can be generated in a softened tone.

The direct current I supplied from the constant current source circuit 108 is also fed into the coil 16, while the low-pass filter circuit 106 removes alternating component (audio signal) to supply DC component of the voltage on the both ends of the coil 16, that is, the direct voltage Vr on the both ends of the coil 16 related only to the direct current I supplied from the constant current source circuit 108 to the A/D converting circuit 27.

Next, the program processing of the microcomputer 30 will be explained. In the execution of the program, similarly to the second embodiment, the microcomputer 30 receives the atmosphere temperature Ta from the atmosphere temperature sensor 22 via the A/D converting circuit 23 at step S11 of FIG. 20, receives the terminal voltage Vr (DC voltage component) of the coil 16 via the low-pass filter circuit 106 and the A/D converting circuit 23 at step S101, and calculates the coil temperature Tc1 (the first measured temperature) by use of the terminal voltage Vr at step S102.

In this case, the correlation between the resistance value $R_L$ of the coil 16, the direct current I output from the constant current source circuit 108 and fed into the coil 16, and the terminal voltage Vr of the coil 16 resulting from the direct current I is expressed by an equation 13 given below.

$$R_L = \frac{Vr}{I} \qquad \text{[Equation 13]}$$

In this case, since the direct current I is a known value, the input terminal voltage Vr is substituted into the equation 13 to figure out the resistance value $R_L$ of the coil 16.

Next, by use of the calculated resistance value $R_L$ (the same as the resistance value R2 of the equation 12) of the coil 16, the coil temperature Tc1 (the same as T2 of the equation 12) is calculated in accordance with an equation 14 given below, similarly to the second embodiment.

$$Tc1 = \frac{260 \cdot R_L}{R_{25.5}} - 234.5 \qquad \text{[Equation 14]}$$

After the above-described step S102, similarly to the second embodiment, the microcomputer 30 receives the voltage V applied to the coil 16 at step S13, and calculates the coil temperature Tc2 (the second measured temperature) by use of the atmosphere temperature Ta and the application voltage V at step S14. The other steps of the program are similar to those of the second embodiment. However, as for the display of causes of the fault of the coil temperature sensor 21 at steps S20 and S22 of FIG. 3A, and steps S28, S30 and S32 of FIG. 3B, a message indicative of a fault of a circuit for generating or sensing the voltage value Vr such as the constant current source circuit 108 or the low-pass filter circuit 106, or a fault caused by erroneous calculation of the coil temperature Tc1 is displayed.

In the first modification as well which operates as described above, by step S102, the resistance value $R_L$ of the coil 16 is calculated by use of the terminal voltage Vr of the resistance 105 to calculate the coil temperature Tc1 as the first measured temperature by use of the calculated resistance value $R_L$ on the basis of the relation between the resistance value $R_L$ and the temperature of the coil 16. By step S14, furthermore, the coil temperature Tc2 is calculated as the second measured temperature by use of the voltage V applied to the coil 16 and the atmosphere temperature Ta on the basis of the thermal equivalent circuit of the transducer 40. By use of the calculated coil temperatures Tc1 and Tc2, and the atmosphere temperature Ta, similarly to the second embodiment, the control of supply of audio signals to the coil 16, and the judgment and display of various faults are done. Therefore, the first modification can also protect the coil 16 and its peripheral devices and can allow a user to appropriately cope with the fault.

b2. Second Modification

Figure 22:
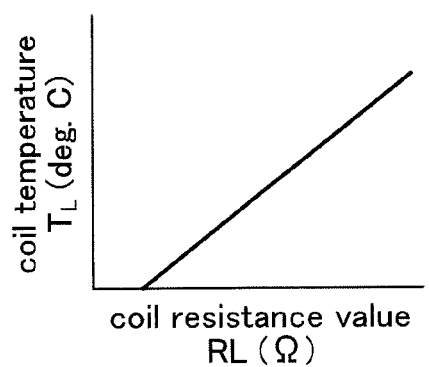
FIG. 22 is a graph indicating relation between resistance value and temperature of the coil according to the second modification of the second embodiment.

In the second embodiment, by the performance of the equation 12, the coil temperature Tc1 (T2) is calculated by the performance of the calculation using the resistance value $R_L$ (R2) of the coil 16. In the first modification of the second embodiment, furthermore, by the performance of the equation 14, the coil temperature Tc1 is calculated by the performance of the calculation using the resistance value $R_L$ of the coil 16. Instead of the embodiment and modification, however, a conversion table indicative of the correlation between the resistance value $R_L$ and the temperature $T_L$ of the coil 16 shown in FIG. 22 may be provided so that the calculated resistance value R2 ($R_L$) can be converted to the temperature $T_L$ (Tc1) by use of the provided conversion table to obtain the coil temperature Tc1. For the calculation of the resistance value $R_L$ on the basis of the voltage value Vr, furthermore, a conversion table for converting from the voltage value Vr to the resistance value $R_L$ may be provided so that the resistance value $R_L$ can be calculated on the basis of the voltage value Vr by use of the conversion table.

b3. Other Modifications

Furthermore, the calculation of the coil temperature Tc2 (the second measured temperature) which is employed in the first to third modifications of the first embodiment explained in the above-described a1 to a3 can be also applied to the second modification and its modifications. Furthermore, the position according to the fourth modification of the first embodiment explained in the above-described a4 where the voltage V applied to the coil 16 is retrieved can be also applied to the second embodiment and its modifications. Furthermore, the calculation of the coil temperature Tc2 (the second measured temperature) in consideration of wind velocity according to the fifth modification explained in the above-described a5 can be also applied to the second embodiment and its modifications. Furthermore, the restriction on supply of audio signals to the coil 16 by use of the electronic switch circuit 24-1 and the electronic volume 24-2 according to the sixth modification of the first embodiment explained in the above-described a6 can be also applied to the second embodiment and its modifications. Furthermore, the control of supply of audio signals to the coil 16 by the coil temperature Tc2 according to the seventh modification of the first embodiment explained in the above-described a7 can be also applied to the second embodiment and its modifications. Furthermore, the modification of the transducer 40 according to the eighth modification of the first embodiment explained in the above-described a8 can be also applied to the second embodiment and its modifications.

c. Third Embodiment

Figure 23:
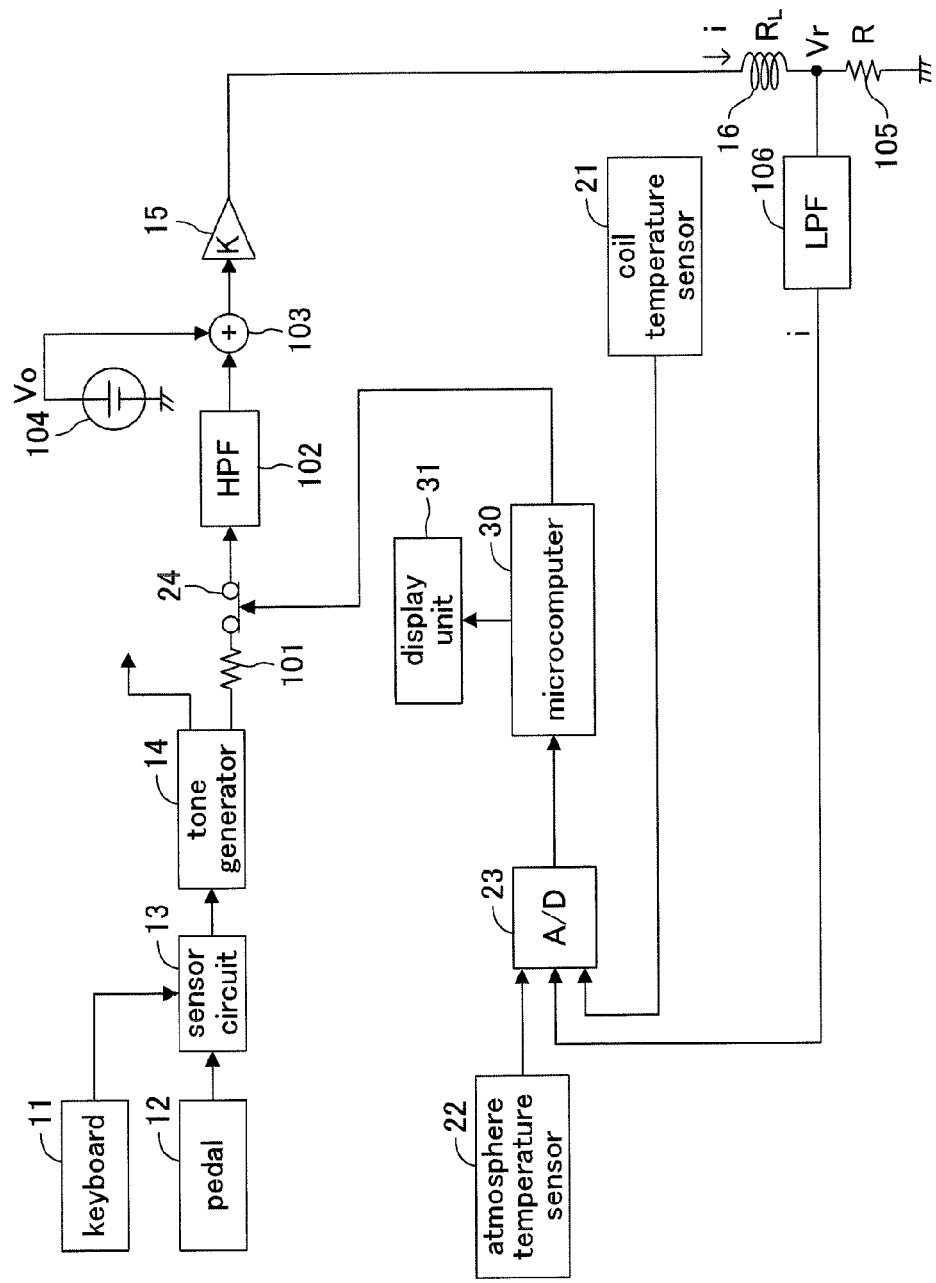
FIG. 23 is a schematic block diagram indicating an electronic circuit embedded in a piano in order to vibrate a sound board according to the third embodiment of the present invention.

Next, a piano according to the third embodiment of the present invention will be explained. The third embodiment is configured such that the coil temperature Tc1 is measured by the coil temperature sensor 21 as the first measured temperature, and the resistance value $R_L$ of the coil 16 is detected to figure out the coil temperature Tc2 as the second measured temperature on the basis of the relation between the resistance value $R_L$ and the temperature of the coil 16. A schematic block diagram of an electronic circuit for vibrating a sound board embedded in the piano according to the third embodiment is shown in FIG. 23. In the schematic block diagram of FIG. 23, the path of the voltage V applied to the coil 16 provided in the schematic block diagram of FIG. 19 according to the second embodiment is omitted, but the coil temperature sensor 21 of the first embodiment is connected to the A/D converting circuit 23. In the third embodiment, since the other components of the third embodiment are configured similarly to the second embodiment, the same components are given the same numerical references as those of the second embodiment to omit explanation about the components.

Figure 24:
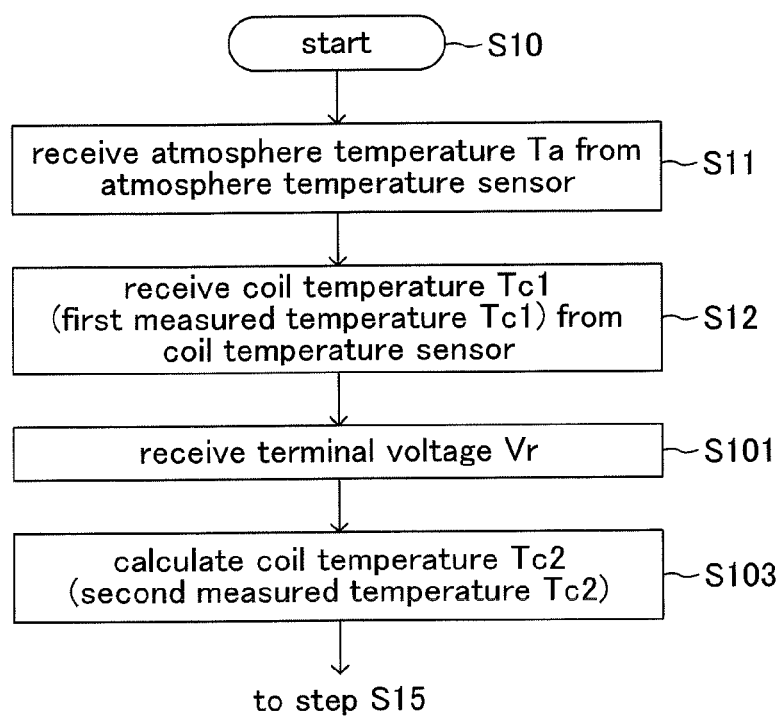
FIG. 24 is a flowchart of a modified part of the flowchart indicated in FIGS. 3A to 3C according to a program executed by the microcomputer of the third embodiment.

In the third embodiment, furthermore, the microcomputer 30 executes a program obtained by replacing the steps S13 and S14 of the program shown in FIG. 3A to FIG. 3C with steps S101 and S103 shown in FIG. 24.

Next, behavior of the piano according to the third embodiment configured as above will be explained. In the third embodiment as well, when a player operates the keyboard 11 and the pedal 12 for musical performance, the tone generator 14 outputs an electric musical tone signal (audio signal) indicative of a piano sound corresponding to the musical performance, as in the case of the second embodiment. In the third embodiment as well, an electric signal obtained by superimposing the predetermined DC voltage Vo on the audio signal is supplied from the constant voltage source circuit 104 to the coil 16 and the resistance 105 via the amplifier circuit 15. This voltage signal vibrates the sound board 48 and the bridge 49 to generate a musical tone similar to that of the second embodiment.

In this state, the microcomputer 30 repeatedly executes the program at every predetermined short period of time. In the execution of this program, the microcomputer 30 receives the atmosphere temperature Ta from the atmosphere temperature sensor 22 via the A/D converting circuit 23 at step S11 of FIG. 24 similarly to the first and second embodiments, and receives the coil temperature Tc1 from the coil temperature sensor 21 as the first measured temperature at step S12 similarly to the first embodiment. Next, at step S101, similarly to the second embodiment, the microcomputer 30 receives the terminal voltage Vr (DC voltage component) of the resistance 105 via the low-pass filter circuit 106 and the A/D converting circuit 23, and calculates the coil temperature Tc2 as the second measured temperature by use of the terminal voltage Vr at step S103. The calculation of the coil temperature Tc2 at step S103 is completely the same as the calculation of the coil temperature Tc1 at step S102 of FIG. 20 of the second embodiment. Since only a point that the calculation in the third embodiment is performed to figure out the coil temperature Tc2 (the second measured temperature) is different from the second embodiment, detailed explanation about the calculation will be omitted.

After the above-described step S103, the microcomputer 30 carries out the step S15 and later steps which are similar to those of the first and second embodiments. In the third embodiment, however, the coil temperature Tc2 is figured out not by adding the atmosphere temperature Ta as in the cases of the first and second embodiments, but by use of the correlation between the resistance value $R_L$ and the temperature of the coil 16, independently of the atmosphere temperature Ta. In the judgment at step S25 of FIG. 3B, therefore, it is judged whether the coil temperature Tc2 is lower than a temperature value (Ta−5), similarly to the judgment of step S27. At the above-described step S24 of FIG. 3A and at the above-described steps S26, S30 and S32 of FIG. 3B, furthermore, a message indicative of a fault of a circuit for generating or sensing the voltage value Vr such as the constant voltage source circuit 104, the resistance 105 or the low-pass filter circuit 106, or a fault caused by erroneous calculation of the coil temperature Tc2 is also displayed.

In the third embodiment which operates as described above, by step S12, the coil temperature Tc1 sensed by the coil temperature sensor 21 is received as the first measured temperature, while by step S103, the resistance value $R_L$ of the coil 16 is calculated by use of the terminal voltage Vr of the resistance 105 to calculate the coil temperature Tc2 as the second measured temperature by use of the calculated resistance value $R_L$ on the basis of the relation between the resistance value $R_L$ and the temperature of the coil 16. By use of the calculated coil temperatures Tc1 and Tc2, and the atmosphere temperature Ta, similarly to the first and second embodiments, the control of supply of audio signals to the coil 16, and the judgment and display of various faults are done. Therefore, the third embodiment can also protect the coil 16 and its peripheral devices appropriately, and can allow a user to appropriately cope with the fault.

c1. First Modification

Figure 25:
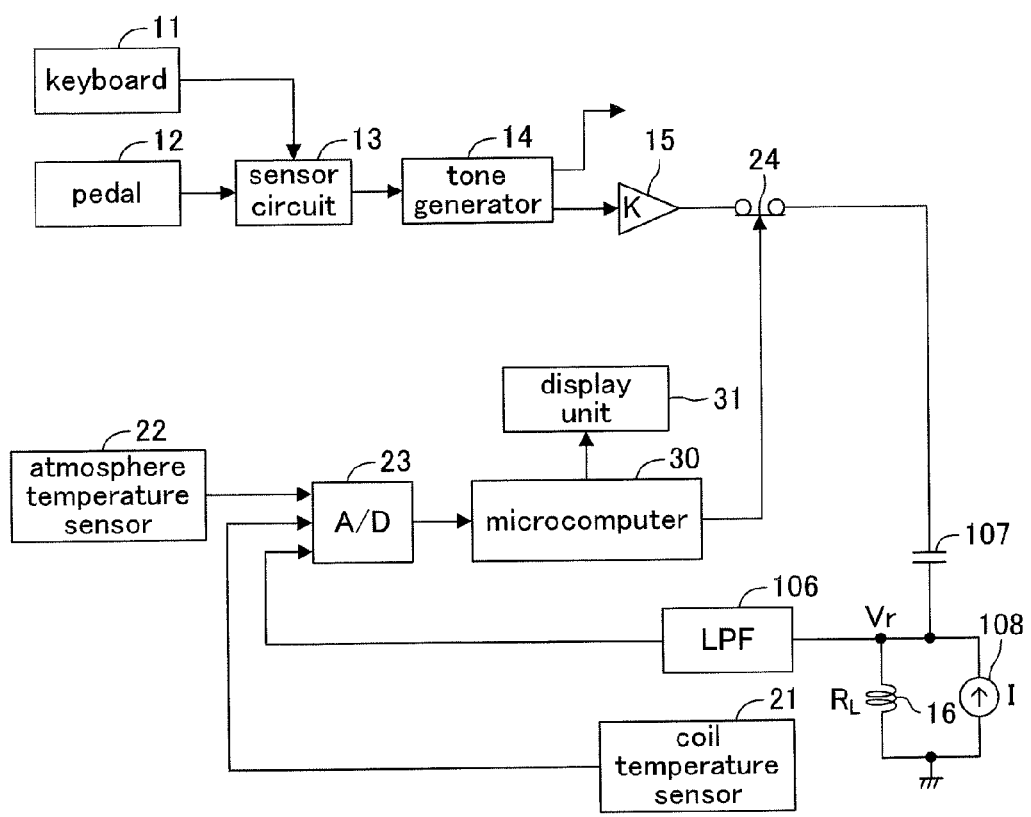
FIG. 25 is a schematic block diagram indicating an electronic circuit embedded in a piano in order to vibrate a sound board according to the first modification of the third embodiment.

Next, the first modification of the third embodiment will be explained. In the first modification, the calculation of the coil temperature Tc2 which is the second measured temperature is modified from that of the third embodiment. The first modification is configured such that the coil temperature Tc2 of the third embodiment is measured by the method using the resistance value $R_L$ of the coil 16 similarly to the coil temperature Tc1 of the first modification of the second embodiment. A schematic block diagram showing an electronic circuit for vibrating the sound board embedded in the piano according to the first modification of the third embodiment is shown in FIG. 25. In the schematic block diagram of FIG. 25, the path of the voltage V applied to the coil 16 provided in the schematic block diagram of FIG. 21 according to the first modification of the second embodiment is omitted, but the coil temperature sensor 21 of the first embodiment is connected to the A/D converting circuit 23. In the first modification, since the other components of the first modification are configured similarly to the first modification of the second embodiment, the same components are given the same numerical references as those of the first modification of the second embodiment to omit explanation about the components.

In the first modification of the third embodiment, furthermore, the microcomputer 30 executes a program obtained by replacing the steps S12 and S13 of the program shown in FIG. 3A to FIG. 3C with steps S101 and S103 shown in FIG. 24, similarly to the third embodiment.

Next, behavior of the piano according to the first modification of the third embodiment configured as above will be explained. In the first modification of the third embodiment as well, when a player operates the keyboard 11 and the pedal 12 for musical performance, an audio signal generated by the tone generator 14 in accordance with the musical performance on the keyboard 11 and the pedal 12 is fed into the coil 16 via the capacitor 107, so that the sound board 48 is vibrated by the audio signal, similarly to the first modification of the second embodiment.

In this state, the microcomputer 30 repeatedly executes the program at every predetermined short period of time. In the execution of this program, similarly to the third embodiment, by the steps S11, S12, S101 and S103 of FIG. 24, the microcomputer 30 receives the atmosphere temperature Ta, the coil temperature Tc1 and the terminal voltage Vr, and calculates the coil temperature Tc2. However, the calculation of the coil temperature Tc2 at step S103 is different from the calculation employed in the third embodiment, but is completely the same as the calculation of the coil temperature Tc1 at step S102 of FIG. 20 of the first modification of the second embodiment. Since only a point that the calculation in this modification is performed to figure out the coil temperature Tc2 (the second measured temperature) is different from the first modification of the second embodiment, detailed explanation about the calculation will be omitted.

After the above-described step S103, the microcomputer 30 carries out the step S15 and later steps which are similar to those of the third embodiment. In this modification as well, furthermore, the coil temperature Tc2 is figured out not by adding the atmosphere temperature Ta as in the cases of the first and second embodiments, but by use of the correlation between the resistance value $R_L$ and the temperature of the coil 16, independently of the atmosphere temperature Ta. In the judgment at step S25 of FIG. 3B, therefore, it is judged whether the coil temperature Tc2 is lower than a temperature value (Ta−5), similarly to the judgment of step S27. At the above-described step S24 of FIG. 3A and the above-described steps S26, S30 and S32 of FIG. 3B, furthermore, slightly differently from the third embodiment, a message indicative of a fault of a circuit for generating or sensing the voltage value Vr such as the constant current source circuit 108 or the low-pass filter circuit 106, or a fault caused by erroneous calculation of the coil temperature Tc2 is also displayed.

In the first modification of the third embodiment which operates as described above as well, by step S12, the coil temperature Tc1 sensed by the coil temperature sensor 21 is received as the first measured temperature, while by step S103, the resistance value $R_L$ of the coil 16 is calculated by use of the terminal voltage Vr of the coil 16 to calculate the coil temperature Tc2 as the second measured temperature by use of the calculated resistance value $R_L$ on the basis of the relation between the resistance value $R_L$ and the temperature of the coil 16. By use of the calculated coil temperatures Tc1 and Tc2, and the atmosphere temperature Ta, similarly to the third embodiment, the control of supply of audio signals to the coil 16, and the judgment and display of various faults are done. Therefore, the first modification of the third embodiment can also protect the coil 16 and its peripheral devices appropriately, and can allow a user to appropriately cope with the fault.

c2. Second Modification

In the third embodiment, by the performance of the equation 12, the coil temperature Tc2 is calculated by the performance of the calculation using the resistance value $R_L$ (R2) of the coil 16. In the first modification of the third embodiment, furthermore, by the performance of the equation 14, the coil temperature Tc2 is calculated by the performance of the calculation using the resistance value $R_L$ of the coil 16. Instead of the embodiment and modification, however, similarly to the case of the second modification of the second embodiment, a conversion table indicative of the correlation between the resistance value $R_L$ and the temperature $T_L$ of the coil 16 shown in FIG. 22 may be provided so that the calculated resistance value R2 ($R_L$) can be converted to the temperature $T_L$ (Tc1) by use of the provided conversion table to obtain the coil temperature Tc2. For the calculation of the resistance value $R_L$ on the basis of the voltage value Vr, furthermore, a conversion table for converting from the voltage value Vr to the resistance value $R_L$ may be provided so that the resistance value $R_L$ can be calculated on the basis of the voltage value Vr by use of the conversion table.

c3. Other Modifications

Furthermore, the restriction on supply of audio signals to the coil 16 by use of the electronic switch circuit 24-1 and the electronic volume 24-2 according to the sixth modification of the first embodiment explained in the above-described a6 can be also applied to the third embodiment and its modifications. Furthermore, the control of supply of audio signals to the coil 16 by the coil temperature Tc2 according to the seventh modification of the first embodiment explained in the above-described a7 can be also applied to the third embodiment and its modifications.

d. Other Embodiments

The first embodiment and its modifications are configured such that the two kinds of coil temperatures Tc1 and Tc2 are obtained by direct sensing by the coil temperature sensor 21 and the calculation on the basis of the thermal equivalent circuit of the transducer 40, respectively. Furthermore, the second embodiment and its modifications are configured such that the two kinds of coil temperatures Tc1 and Tc2 are figured out by the calculation in which the resistance value $R_L$ of the coil 16 is converted to a temperature, and the calculation on the basis of the thermal equivalent circuit of the transducer 40, respectively. Furthermore, the third embodiment and its modifications are configured such that the two kinds of coil temperatures Tc1 and Tc2 are obtained by direct sensing by the coil temperature sensor 21 and the calculation in which the resistance value $R_L$ of the coil 16 is converted to a temperature, respectively.

However, the two kinds of coil temperatures Tc1 and Tc2 may be obtained by a combination of two items selected from the direct sensing by the two coil temperature sensors, various kinds of calculations using the thermal equivalent circuit of the transducer 40 explained in the first and second embodiments and their modifications, and calculation by which the resistance value $R_L$ of the coil 16 is converted to a temperature explained in the second and third embodiments and their modifications.

Furthermore, the first to third embodiments and their modifications are configured such that an audio signal output from the tone generator 14 is supplied to the coil 16 of the transducer 40, so that the sound board 48 is vibrated by the transducer 40. However, the first to third embodiments and their modifications may be modified such that an audio signal output from the tone generator 14 is supplied to respective coils of a plurality of transducers, so that the sound board 48 is vibrated by the plurality of transducers.

Furthermore, the first to third embodiments and their modifications are configured such that the present invention is applied to a piano. However, the invention can be also applied to electronic musical instruments which do not normally have a sound board but are provided with a sound board vibrated by an audio signal so that the newly provided sound board is vibrated by the transducer 40. Furthermore, the invention can be also applied to a sound signal converting apparatus for converting audio signals to sound signals not by the vibration of the sound board but by a speaker which vibrates a vibrating member such as a cone paper by energization of a voice coil. In this case, the coil 16 of the first to third embodiments and their modifications may be employed as the voice coil of the speaker.

Furthermore, the first to third embodiments and their modifications are configured such that audio signals are generated by the tone generator 14 in accordance with musical operation on the keyboard 11 and the pedal 12. However, the first to third embodiments and their modifications may be modified such that audio signals are generated by the tone generator 14 in accordance with musical operation of a musical performance operating element other than the keyboard 11 and the pedal 12. Furthermore, audio signals may be generated by the tone generator 14 in accordance with previously stored musical performance data. Furthermore, the present invention can be applied not only to musical instruments but also to various kinds of sound signal converting devices as long as the sound signal converting devices can convert an audio signal to a sound signal by use of a transducer, a speaker or the like. Even without the tone generator 14, more specifically, the sound signal converting devices may convert a recorded audio signal to a sound signal by directly supplying the audio signal to the transducer, the speaker or the like.

What is claimed is:

1. A protection apparatus for a sound signal converting device having a coil that converts an audio signal supplied to the coil to a sound signal, the protection apparatus protecting the sound signal converting device and comprising:
   a level controller configured to supply an input audio signal to the coil in one of a first state where a level of the audio signal is maintained or a second state where supply of the input audio signal to the coil is suspended or the level of the input audio signal to the coil is decreased;
   a first temperature measurement device configured to measure a temperature of the coil as a first measured temperature;

a second temperature measurement device configured to measure the temperature of the coil as a second measured temperature, independently of the first temperature measurement device;

an unexpected condition controller configured to set the level controller to the second state when a difference between the first measured temperature and the second measured temperature is outside a predetermined range; and a temperature controller configured to:
keep the level controller at the first state when the difference between the first measured temperature and the second measured temperature falls within the predetermined range, while one measured temperature, among the first measured temperature and the second measured temperature, is lower than a first predetermined temperature; and switch the level controller to the second state when the difference between the first measured temperature and the second measured temperature falls within the predetermined range, while the one measured temperature is equal to or higher than the first predetermined temperature.

2. The protection apparatus according to claim 1, further comprising:
an atmosphere temperature sensor configured to sense atmosphere temperature of the sound signal converting device,
wherein the unexpected condition controller further sets the level controller to the second state when the one measured temperature is outside a predetermined range of the sensed atmosphere temperature.

3. The protection apparatus according to claim 2, wherein the unexpected condition controller further sets the level controller to the second state when the sensed atmosphere temperature is outside another predetermined range.

4. The protection apparatus according to claim 1, wherein the unexpected condition controller further sets the level controller to the second state when the one measured temperature is outside another predetermined range.

5. The protection apparatus according to claim 1, further comprising:
a display device; and
an unexpected condition display controller configured to display a type of unexpected condition of one of the first temperature measurement device or the second temperature measurement device, on the display device, when the level controller is set to the second state by the unexpected condition controller.

6. The protection apparatus according to claim 1, wherein the temperature controller further includes a level control cancel controller configured to switch the level controller to the first state when the one measured temperature is lower than a second predetermined temperature, which is lower than the first predetermined temperature, while the level controller is in the second state.

7. The protection apparatus according to claim 1, wherein:
the first temperature measurement device comprises a temperature sensor that senses the temperature of the coil, and
the second temperature measurement device calculates the temperature of the coil on the basis of a thermal equivalent circuit of the sound signal converting device.

8. The protection apparatus according to claim 1, wherein:
the first temperature measurement device determines the temperature of the coil on the basis of a change in a resistance value of the coil, and
the second temperature measurement device calculates the temperature of the coil on the basis of a thermal equivalent circuit of the sound signal converting device.

9. The protection apparatus according to claim 1, wherein:
the first temperature measurement device comprises a temperature sensor that senses the temperature of the coil, and
the second temperature measurement device determines the temperature of the coil on the basis of a change in a resistance value of the coil.

10. The protection apparatus according to claim 2, further comprising:
a display device; and
an unexpected condition display controller configured to display a type of unexpected condition of one of the first temperature measurement device or the second temperature measurement device, on the display device, when the level controller is set to the second state by the unexpected condition controller.

11. The protection apparatus according to claim 3, further comprising:
a display device; and
an unexpected condition display controller configured to display a type of unexpected condition of one of the first temperature measurement device or the second temperature measurement device, on the display device, when the level controller is set to the second state by the unexpected condition controller.

12. The protection apparatus according to claim 4, further comprising:
a display device; and
an unexpected condition display controller configured to display a type of unexpected condition of one of the first temperature measurement device or the second temperature measurement device, on the display device, when the level controller is set to the second state by the unexpected condition controller.

13. A protection apparatus for a sound signal converting device having a coil that converts an audio signal supplied to the coil to a sound signal, the protection apparatus protecting the sound signal converting device and comprising:
a level control device switchable among a first state and a second state, the first state supplying an input audio signal to the coil so that a level of the audio signal is maintained, and the second state suspending supplying of the input audio signal to the coil or decreasing the level of the input audio signal supplied to the coil;
a first temperature measurement device that outputs a first signal;
a second temperature measurement device that outputs a second signal; and
a controller configured to execute:
a first temperature determining task that determines the temperature of the coil as a first temperature based on the first signal;
a second temperature determining task that determines the temperature of the coil as a second temperature based on the second signal; and
a level setting task that:
sets the level control device to the first state when a difference between the first temperature and the second temperature falls within the predetermined range, while one temperature, among the first temperature and the second temperature, is lower than a first predetermined temperature;

sets the level control device to the second state when the difference between the first temperature and the second temperature falls within the predetermined range, while the one temperature is equal to or higher than the first predetermined temperature; and sets the level control device to the second state when the difference between the first temperature and the second temperature is outside a predetermined range.

14. The protection apparatus according to claim 13, further comprising:

an atmosphere temperature sensor that senses atmosphere temperature of the sound signal converting device, wherein the level setting task also sets the level control device to the second state when the one temperature is outside a predetermined range of the sensed atmosphere temperature.

15. The protection apparatus according to claim 14, wherein the level setting task also sets the level control device to the second state when the sensed atmosphere temperature is outside another predetermined range.

16. The protection apparatus according to claim 13, further comprising:

a display device, wherein the controller is configured to execute a displaying task that displays a type of unexpected condition of the second state on the display device when the switch is set to the second state.

17. The protection apparatus according to claim 13, wherein the controller further configured to execute a level cancel task that sets the level control device to the first state when the one temperature is lower than a second predetermined temperature, which is lower than the first predetermined temperature, while the level control device is in the second state.

18. The protection apparatus according to claim 13, wherein:

the first temperature measurement device comprises a temperature sensor that outputs the first signal, and the second signal corresponds to a voltage of the audio signal applied to the coil.

19. The protection apparatus according to claim 13, wherein:

the first temperature determining task measures a resistance value of the coil based on the first signal and determines the temperature of the coil based on a change in the resistance value of the coil, and the second signal corresponds to a voltage of the audio signal applied to the coil.

20. The protection apparatus according to claim 13, wherein:

the first temperature measurement device comprises a temperature sensor that outputs the first signal, and the second temperature determining task measures a resistance value of the coil based on the second signal and determines the temperature of the coil based on a change in the resistance value of the coil.

* * * * *